United States Patent
Horikawa et al.

(10) Patent No.: US 11,468,584 B2
(45) Date of Patent: Oct. 11, 2022

(54) DEPTH INFORMATION GENERATING APPARATUS, IMAGE CAPTURING APPARATUS, DEPTH INFORMATION GENERATING METHOD, IMAGE PROCESSING APPARATUS, AND IMAGE PROCESSING METHOD

(71) Applicant: CANON KABUSHIKI KAISHA, Tokyo (JP)

(72) Inventors: Yohei Horikawa, Tokyo (JP); Takeshi Ogawa, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/987,251

(22) Filed: Aug. 6, 2020

(65) Prior Publication Data

US 2021/0042949 A1  Feb. 11, 2021

(30) Foreign Application Priority Data

Aug. 7, 2019 (JP) .............................. JP2019-145660

(51) Int. Cl.
| | |
|---|---|
| *G06T 7/571* | (2017.01) |
| *H04N 5/265* | (2006.01) |
| *H04N 5/232* | (2006.01) |
| *H04N 13/243* | (2018.01) |
| *H04N 13/207* | (2018.01) |
| *H04N 13/229* | (2018.01) |
| *H04N 13/232* | (2018.01) |

(52) U.S. Cl.
CPC ....... *G06T 7/571* (2017.01); *H04N 5/232125* (2018.08); *H04N 5/265* (2013.01); *H04N 13/207* (2018.05); *H04N 13/243* (2018.05); *G06T 2207/20224* (2013.01); *H04N 13/229* (2018.05); *H04N 13/232* (2018.05)

(58) Field of Classification Search
CPC ... H04N 13/243; H04N 13/207; H04N 13/211
See application file for complete search history.

(56) References Cited

U.S. PATENT DOCUMENTS

| | | | |
|---|---|---|---|
| 4,410,804 A | 10/1983 | Stauffer | |
| 5,973,700 A * | 10/1999 | Taylor | H04N 13/282 345/427 |

(Continued)

FOREIGN PATENT DOCUMENTS

| | | |
|---|---|---|
| JP | 2001-083407 A | 3/2001 |
| JP | 5979849 B | 8/2016 |

(Continued)

*Primary Examiner* — David N Werner
(74) *Attorney, Agent, or Firm* — Cowan, Liebowitz & Latman, P.C.

(57) ABSTRACT

There is provided a depth information generating apparatus. A first generating unit generates first depth information on the basis of a plurality of viewpoint images which are obtained from first shooting and which have mutually-different viewpoints. A second generating unit generates second depth information for a captured image obtained from second shooting by correcting the first depth information so as to reflect a change in depth caused by a difference in a focal distance of the second shooting relative to the first shooting.

5 Claims, 24 Drawing Sheets

(56) References Cited

U.S. PATENT DOCUMENTS

| | | | | |
|---|---|---|---|---|
| 8,619,082 B1* | 12/2013 | Ciurea | ............... | G02B 27/0075 |
| | | | | 345/427 |
| 9,369,689 B1* | 6/2016 | Tran | ...................... | G01S 7/4972 |
| 9,497,380 B1* | 11/2016 | Jannard | .................. | H04N 5/247 |
| 9,565,416 B1* | 2/2017 | Lewkow | ............. | H04N 13/243 |
| 9,729,857 B2* | 8/2017 | Nisenzon | ............ | H04N 13/243 |
| 2011/0025829 A1* | 2/2011 | McNamer | ........... | H04N 13/207 |
| | | | | 348/E13.074 |
| 2013/0335534 A1* | 12/2013 | Hanzawa | ............. | H04N 13/211 |
| | | | | 348/50 |
| 2014/0267633 A1* | 9/2014 | Venkataraman | .......... | G01P 3/38 |
| | | | | 348/48 |
| 2015/0130908 A1* | 5/2015 | Kang | ....................... | G06T 7/90 |
| | | | | 348/46 |
| 2015/0289266 A1* | 10/2015 | Hsu | ...................... | H04W 76/28 |
| | | | | 370/329 |
| 2017/0026633 A1* | 1/2017 | Riza | .................... | H04N 13/211 |
| 2018/0144458 A1* | 5/2018 | Xu | ........................... | G06T 7/70 |
| 2018/0160041 A1* | 6/2018 | Price | ................ | G02B 19/0014 |
| 2018/0176541 A1* | 6/2018 | Abbas | ....................... | G06T 7/33 |
| 2018/0227575 A1* | 8/2018 | Wu | ..................... | H04N 13/158 |
| 2018/0293744 A1* | 10/2018 | Yu | ....................... | H04N 13/111 |
| 2019/0215486 A1* | 7/2019 | Venshtain | .............. | H04N 5/232 |
| 2020/0036905 A1* | 1/2020 | Chang | ................ | H04N 13/246 |
| 2020/0267374 A1* | 8/2020 | Kitago | ................ | H04N 13/243 |

FOREIGN PATENT DOCUMENTS

| | | |
|---|---|---|
| JP | 5198590 B | 9/2017 |
| JP | 2018-007205 A | 1/2018 |

* cited by examiner

IN FOCUS

— A IMAGE PIXEL GROUP

----- B IMAGE PIXEL GROUP

REAR FOCUS

— A IMAGE PIXEL GROUP

----- B IMAGE PIXEL GROUP

FRONT FOCUS

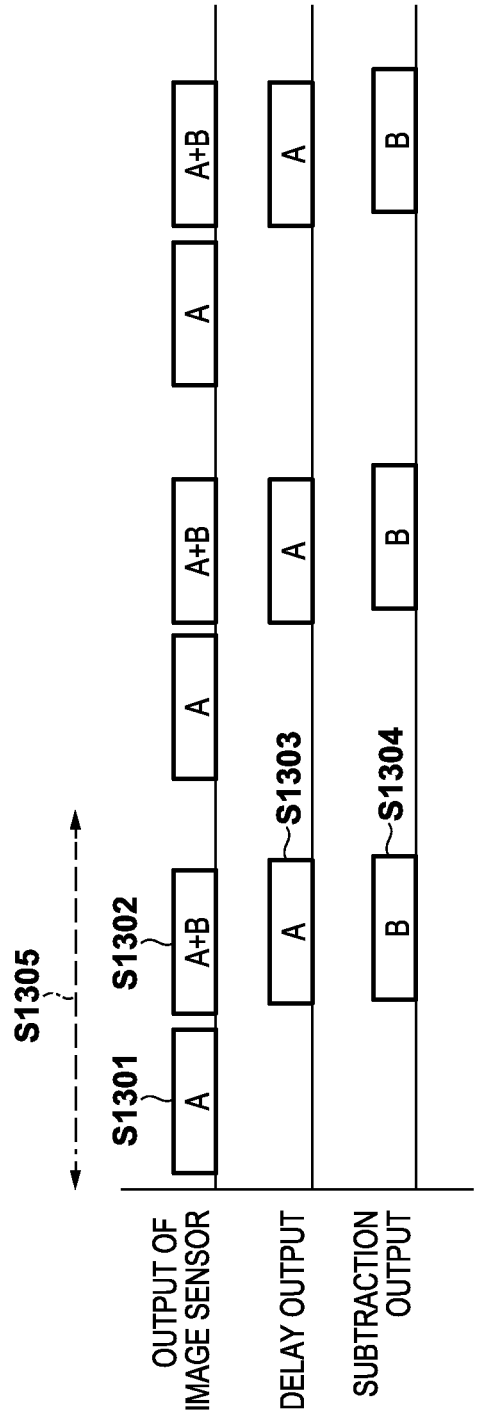

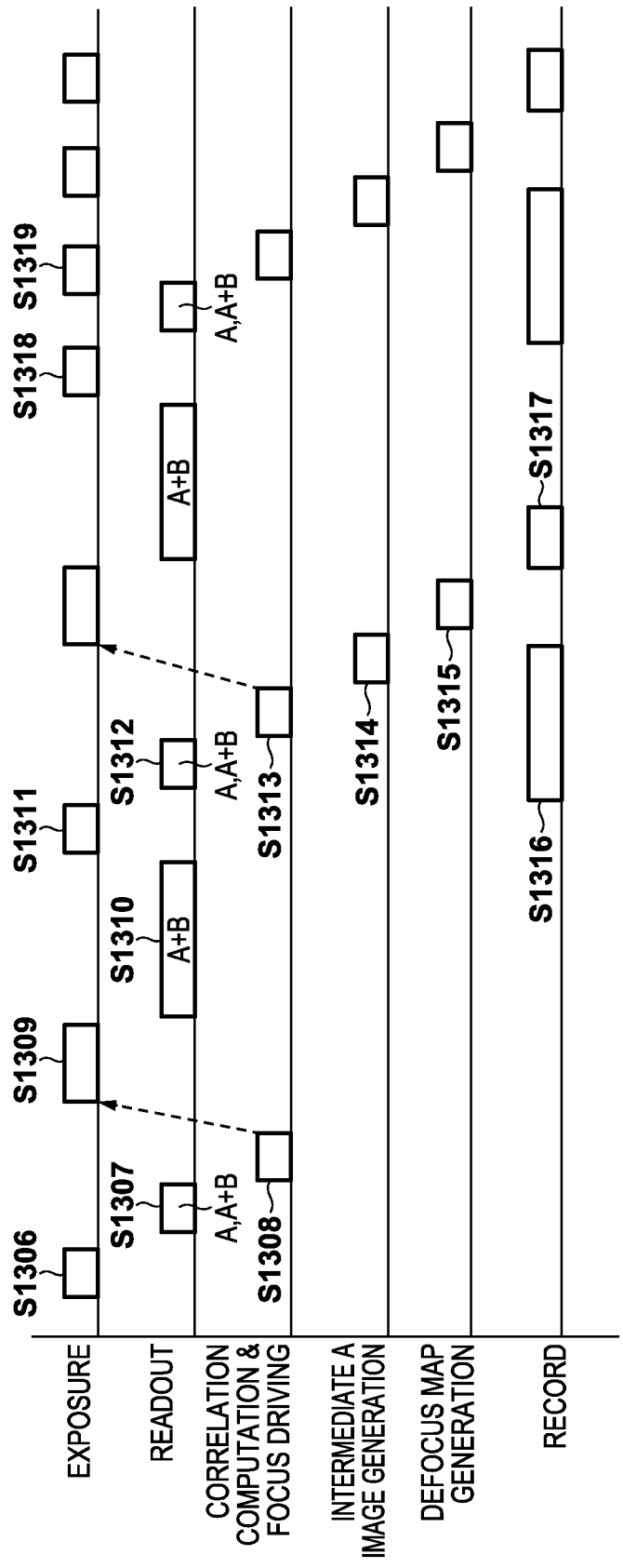

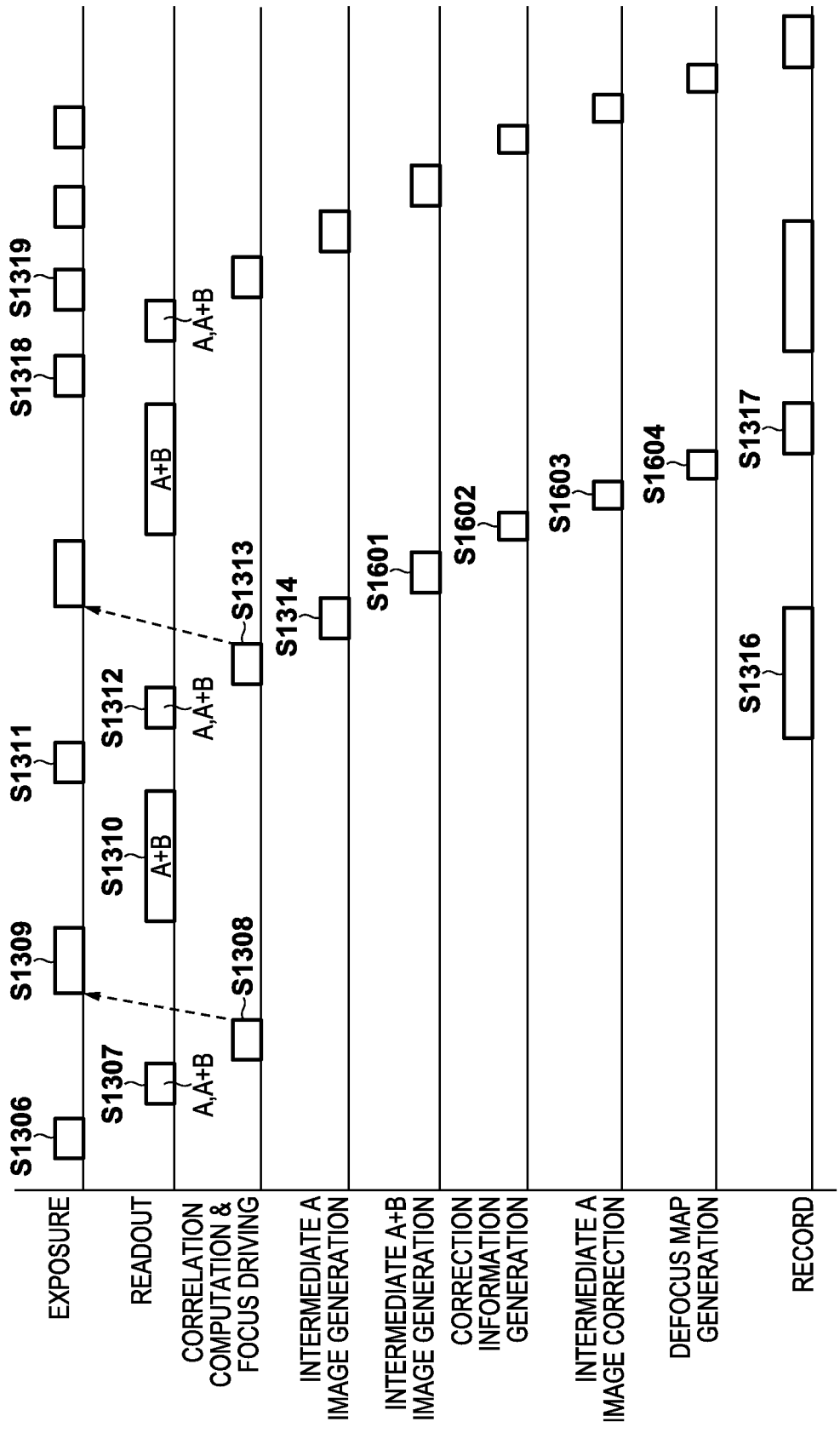

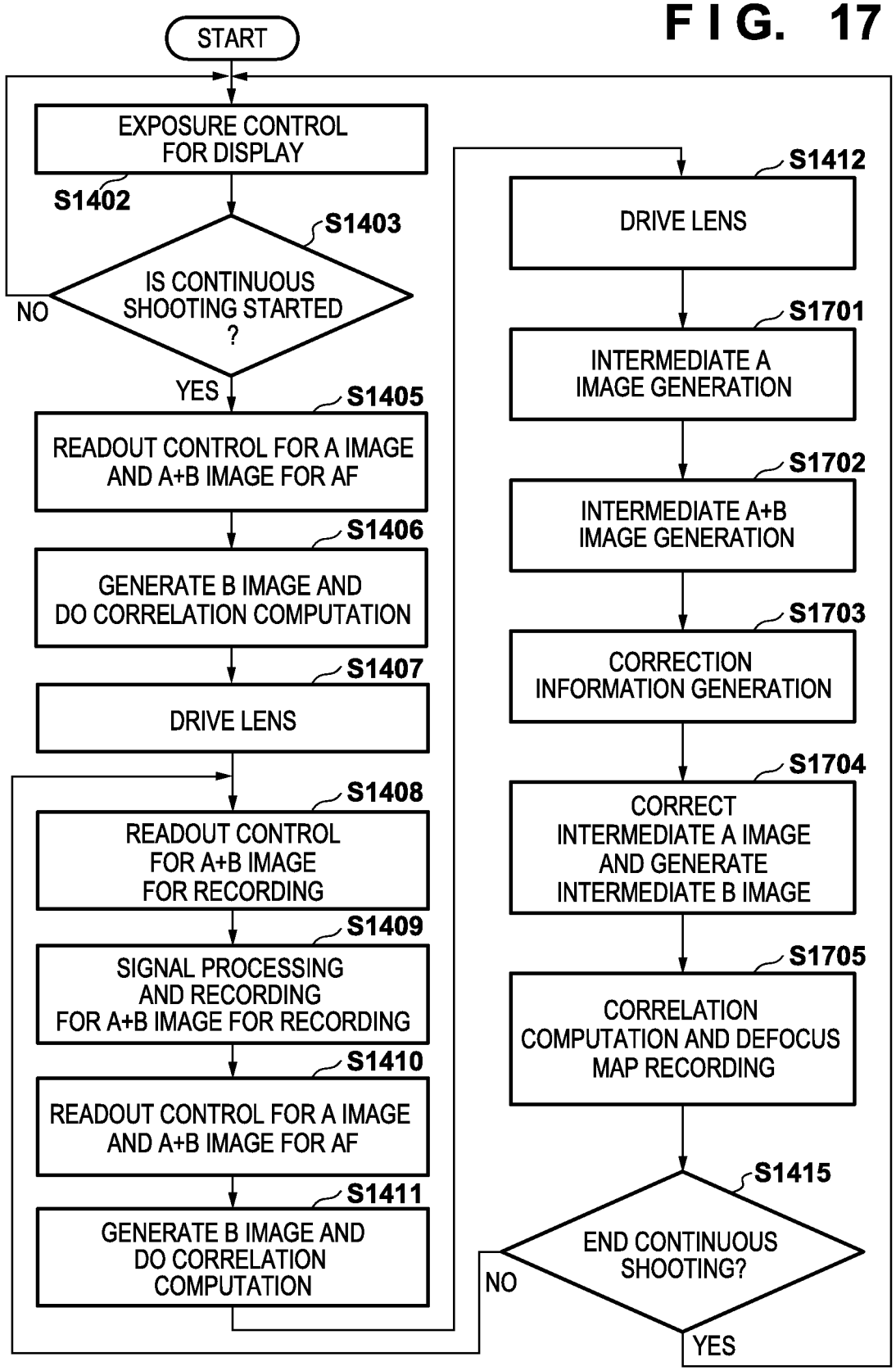

DEPTH INFORMATION GENERATING APPARATUS, IMAGE CAPTURING APPARATUS, DEPTH INFORMATION GENERATING METHOD, IMAGE PROCESSING APPARATUS, AND IMAGE PROCESSING METHOD

BACKGROUND OF THE INVENTION

Field of the Invention

The present invention relates to a depth information generating apparatus, an image capturing apparatus, a depth information generating method, an image processing apparatus, and an image processing method.

Description of the Related Art

An image capturing apparatus has been proposed in which the exit pupil of a shooting lens is divided into a plurality of regions, and a plurality of viewpoint images corresponding to the plurality of partial pupil regions obtained from the division can be captured simultaneously. The specification of U.S. Pat. No. 4,410,804 discloses an image capturing apparatus which uses a two-dimensional image sensor in which a single microlens and a photoelectric conversion unit divided into a plurality of parts are provided for a single pixel. The divided photoelectric conversion unit is pupil-divided through the single microlens, and is configured to receive light from different partial pupil regions of the exit pupil of the shooting lens. A plurality of viewpoint images corresponding to the plurality of partial pupil regions obtained from the dividing can be generated from the signals received from the photoelectric conversion units.

Japanese Patent Laid-Open No. 2001-083407 discloses generating a captured image by adding together all signals obtained as a result of divided photoelectric conversion units receiving light.

Japanese Patent Laid-Open No. 2018-007205 discloses generating a defocus map of a captured image, the captured image generated by adding together all signals obtained as a result of divided photoelectric conversion units receiving light, on the basis of a defocus map obtained from a viewpoint image obtained during live view operations. Specifically, a motion vector is calculated between a display image obtained during live view operations and a captured image obtained during still image shooting, and processing for moving each pixel in the defocus map by a number of pixels equivalent to the motion vector is then carried out.

However, according to the technique of Japanese Patent Laid-Open No. 2018-007205, if a focus lens is moved between when the display image is shot and when the still image is shot, a defocus map which reflects variation in a defocus amount caused by the change in focal distance cannot be generated.

SUMMARY OF THE INVENTION

The present invention has been conceived in light of such circumstances. The present invention provides a technique which makes it possible, when generating depth information (e.g., an image displacement map) corresponding to a given shooting timing from depth information corresponding to a specific shooting timing, to reflect a change in depth caused by a difference in a focal distance.

According to a first aspect of the present invention, there is provided a depth information generating apparatus comprising at least one processor and/or at least one circuit which functions as: a first generating unit configured to generate first depth information on the basis of a plurality of viewpoint images which are obtained from first shooting and which have mutually-different viewpoints; and a second generating unit configured to generate second depth information for a captured image obtained from second shooting by correcting the first depth information so as to reflect a change in depth caused by a difference in a focal distance of the second shooting relative to the first shooting.

According to a second aspect of the present invention, there is provided an image capturing apparatus comprising: an image sensor including a plurality of pixels, each of the pixels having a plurality of photoelectric conversion units that each receives a light beam passing through a different partial pupil region of an exit pupil of an optical imaging system; the depth information generating apparatus according to the first aspect; and at least one processor and/or at least one circuit which functions as a control unit configured to control readout of a signal from the image sensor, wherein in the second shooting, the control unit carries out control for reading out a mixed signal from an entirety of the plurality of photoelectric conversion units, without carrying out control for individually reading out a signal from some of the plurality of photoelectric conversion units.

According to a third aspect of the present invention, there is provided a depth information generating apparatus comprising at least one processor and/or at least one circuit which functions as: a first generating unit configured to generate first depth information on the basis of a plurality of viewpoint images which are obtained from first shooting and which have mutually-different viewpoints, and generate third depth information on the basis of a plurality of viewpoint images which are obtained from third shooting and which have mutually-different viewpoints; and a second generating unit configured to generate, from the first depth information and the third depth information, second depth information for a captured image obtained from second shooting, the second depth information corresponding to a focal distance and a timing of the second shooting, the second depth information being generated on the basis of a change in depth caused by a difference in focal distances of the first shooting, the second shooting, and the third shooting, and on the basis of a difference in timings of the first shooting, the second shooting, and the third shooting.

According to a fourth aspect of the present invention, there is provided a depth information generating method executed by a depth information generating apparatus, comprising: generating first depth information on the basis of a plurality of viewpoint images which are obtained from first shooting and which have mutually-different viewpoints; and generating second depth information for a captured image obtained from second shooting by correcting the first depth information so as to reflect a change in depth caused by a difference in a focal distance of the second shooting relative to the first shooting.

According to a fifth aspect of the present invention, there is provided a depth information generating method executed by a depth information generating apparatus, comprising: generating first depth information on the basis of a plurality of viewpoint images which are obtained from first shooting and which have mutually-different viewpoints, and generate third depth information on the basis of a plurality of viewpoint images which are obtained from third shooting and which have mutually-different viewpoints; and generating, from the first depth information and the third depth information, second depth information for a captured image obtained from second shooting, the second depth information corresponding to a focal distance and a timing of the second shooting, the second depth information being generated on the basis of a change in depth caused by a difference in focal distances of the first shooting, the second shooting, and the third shooting, and on the basis of a difference in timings of the first shooting, the second shooting, and the third shooting.

According to a sixth aspect of the present invention, there is provided an image processing apparatus comprising at least one processor and/or at least one circuit which functions as: a first generating unit configured to, on the basis of a first viewpoint image obtained from first shooting and corresponding to a first partial pupil region of an exit pupil of an optical imaging system, and a second viewpoint image obtained from third shooting and corresponding to the first partial pupil region, generate a third viewpoint image that corresponds to the first partial pupil region and that corresponds to second shooting; and a second generating unit configured to generate a fourth viewpoint image that corresponds to a second partial pupil region of the exit pupil and that corresponds to the second shooting, by subtracting the third viewpoint image from a first mixed image that is obtained from the second shooting and that corresponds to a mixed region in which the first partial pupil region and the second partial pupil region are combined.

According to a seventh aspect of the present invention, there is provided an image processing method executed by an image processing apparatus, comprising: on the basis of a first viewpoint image obtained from first shooting and corresponding to a first partial pupil region of an exit pupil of an optical imaging system, and a second viewpoint image obtained from third shooting and corresponding to the first partial pupil region, generating a third viewpoint image that corresponds to the first partial pupil region and that corresponds to second shooting; and generating a fourth viewpoint image that corresponds to a second partial pupil region of the exit pupil and that corresponds to the second shooting, by subtracting the third viewpoint image from a first mixed image that is obtained from the second shooting and that corresponds to a mixed region in which the first partial pupil region and the second partial pupil region are combined.

Further features of the present invention will become apparent from the following description of exemplary embodiments with reference to the attached drawings.

BRIEF DESCRIPTION OF THE DRAWINGS

FIG. 13A is a timing chart illustrating signals output from the image sensor 1002.

FIG. 13B is a timing chart illustrating continuous shooting operations according to the third embodiment.

FIG. 16 is a timing chart illustrating continuous shooting operations according to the fourth embodiment.

FIG. 17 is a flowchart of a control program executed by a control unit 1011 according to the fourth embodiment.

DESCRIPTION OF THE EMBODIMENTS

Figure 1:
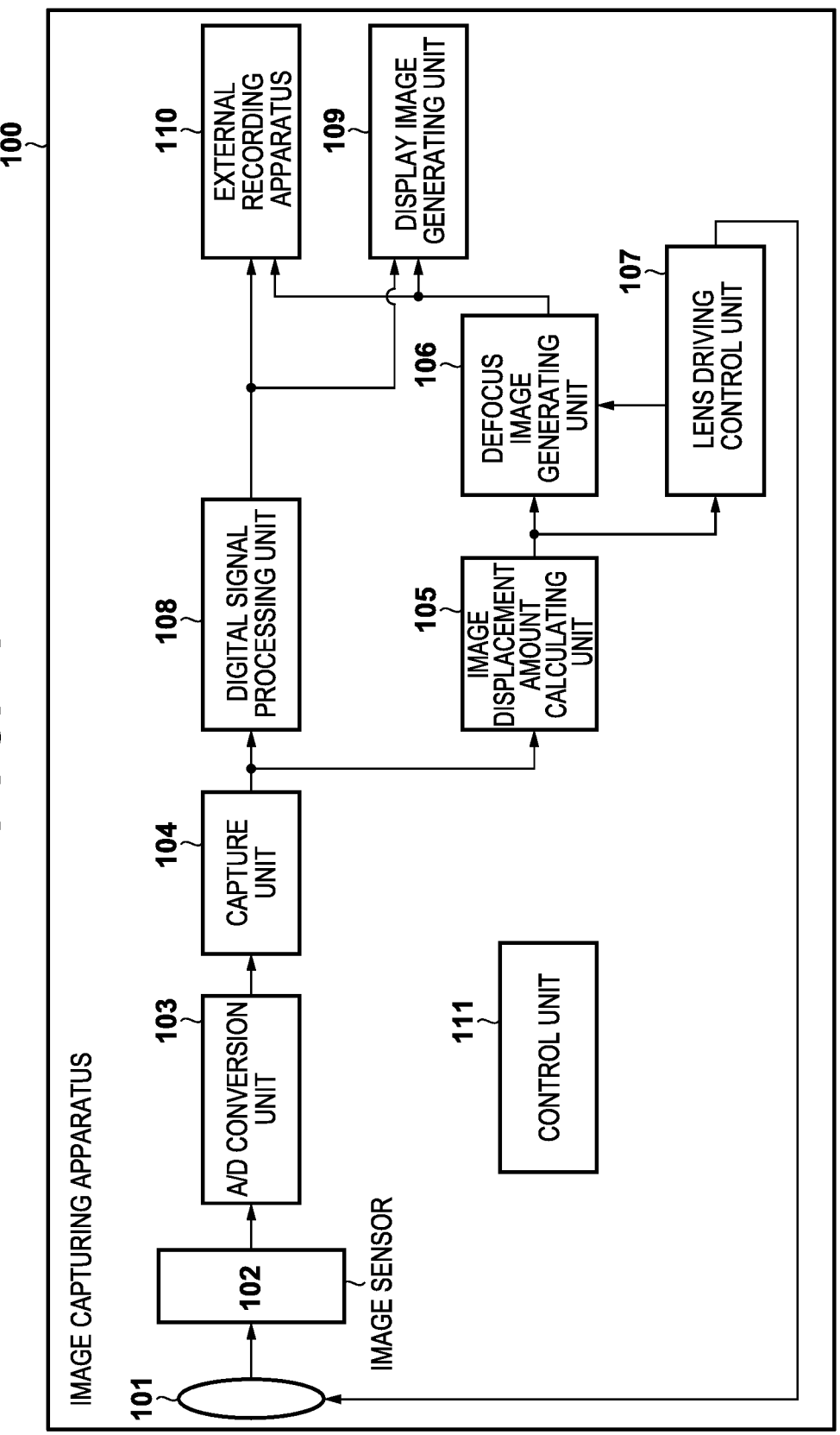
FIG. 1 is a block diagram illustrating the configuration of an image capturing apparatus 100 according to a first embodiment and a second embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

FIG. 1 is a block diagram illustrating the configuration of an image capturing apparatus 100 including a depth information generating apparatus. An optical system unit 101 is constituted by an optical lens group including a focus lens for adjusting the focus, a shutter, an aperture stop, a lens control unit, and the like, and forms an optical image on an image sensor 102.

The image sensor 102 is a solid-state image sensor in which unit pixel cells are arranged in a two-dimensional matrix, and an exposure amount is controlled by the shutter included in the optical system unit 101. The image formed by the optical system unit 101 is photoelectrically converted, and during readout control, charges accumulated in divided photodiodes (PDs) configured within the unit pixels are output sequentially to an A/D conversion unit 103.

Figure 2:
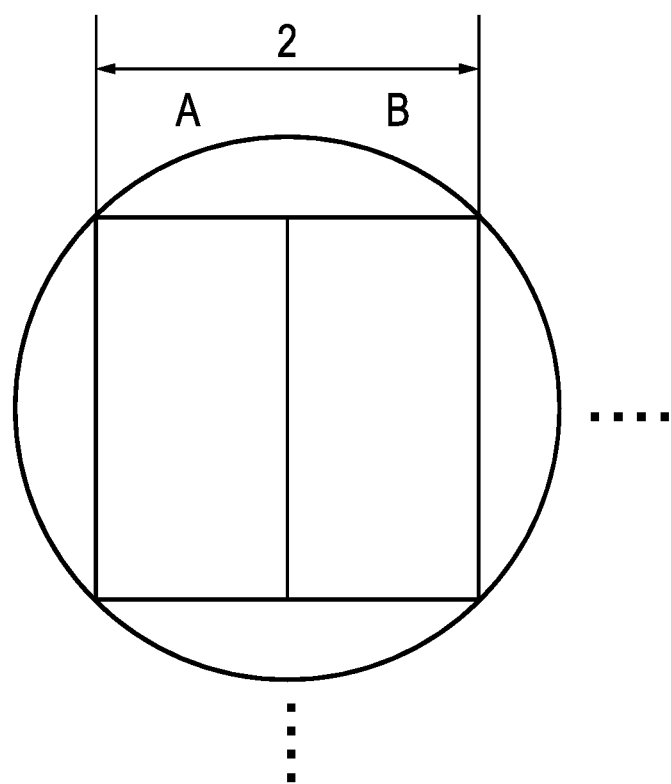
FIG. 2 is a diagram illustrating a unit pixel cell.

The unit pixel cell will be described here with reference to FIG. 2. In FIG. 2, the unit pixel cell includes 2×1 divided pixels for each microlens included in a microlens array. These unit pixel cells are arranged two-dimensionally in a Bayer pattern on the solid-state image sensor.

A two-dimensional image formed only by the pixels present at the corresponding pixel positions in the microlenses has parallax with respect to a two-dimensional image formed only by the pixels present at the other corresponding pixel locations in the microlenses. In other words, there is parallax between an image formed only by pixels corresponding to pixels A in FIG. 2 and an image formed only by pixels corresponding to pixels B in FIG. 2.

With such a pixel configuration, the image sensor 102 can non-destructively read out the charges from the photoelectric conversion units of the pixels A as an A image signal, and then, when reading out the charges from the photoelectric conversion units of the pixels B, can mix those charges with the charges of the pixels A and read out the result as an A+B image signal.

In the present embodiment, during live view shooting, the image sensor 102 reads out the A image signal and the A+B image signal, whereas during still image shooting, the image sensor 102 reads out the A+B image signal without reading out the A image signal. This is done because a greater number of pixels are typically read out during still image shooting than during live view shooting, and an increase in the power consumption, the readout time, and so on can be suppressed.

Figure 3A:
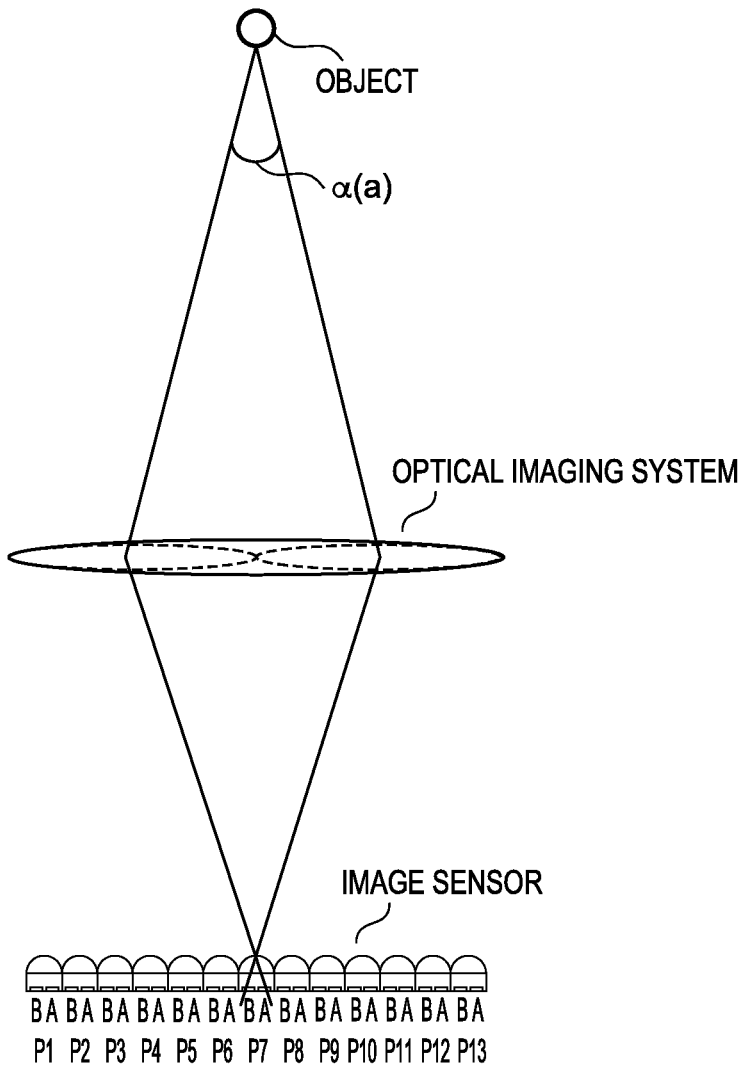
FIGS. 3A to 3C are diagrams illustrating principles for obtaining parallax images.
Figure 3B:
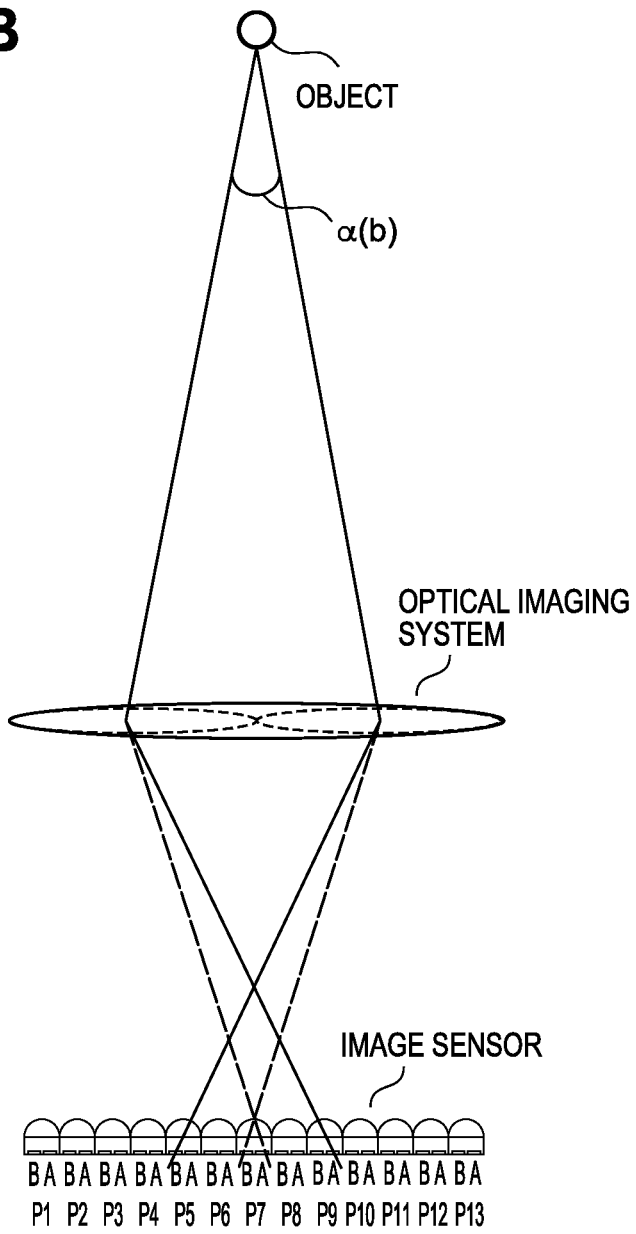
Figure 3C:
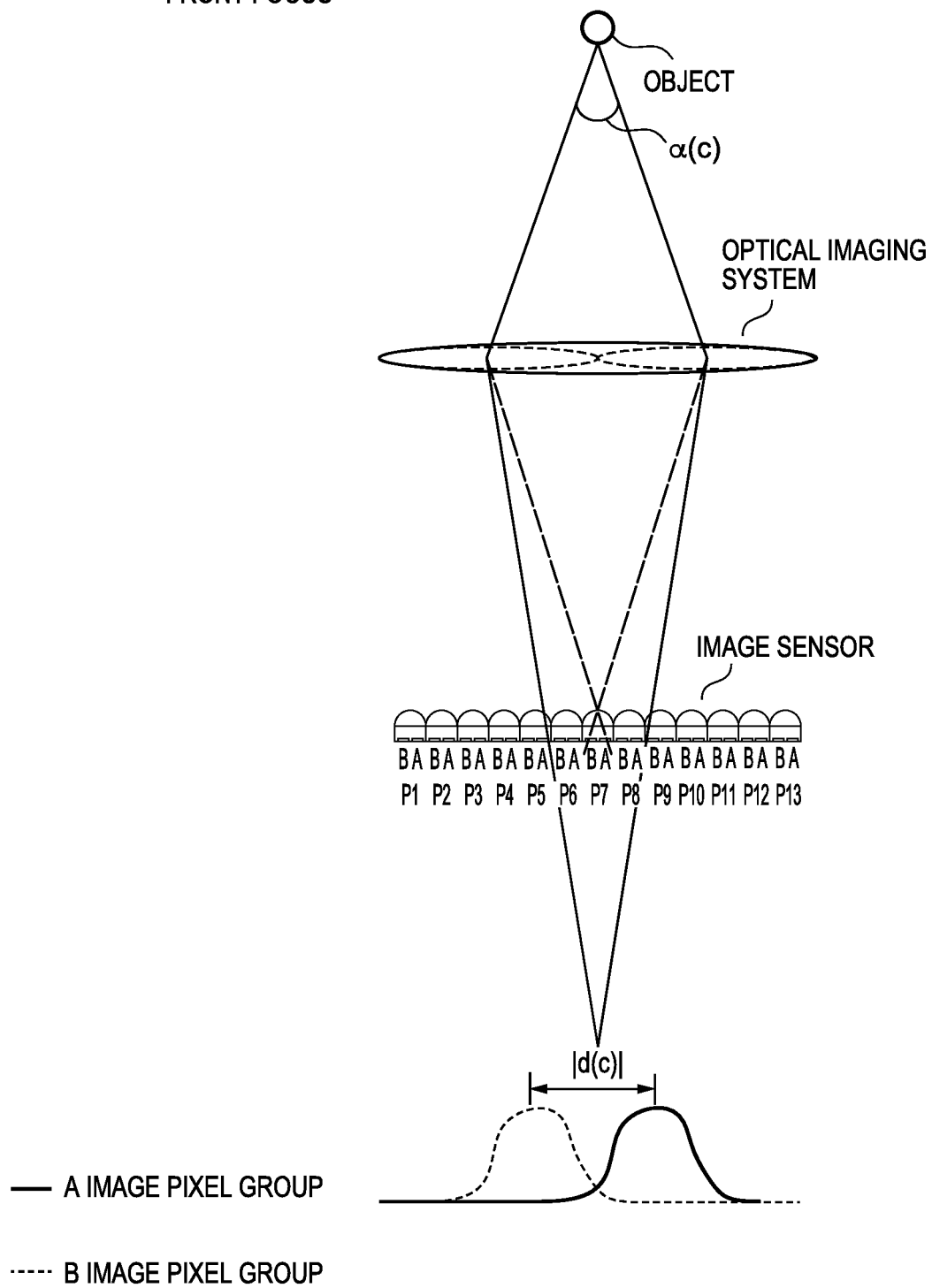

The principles for obtaining parallax images will be described next with reference to FIGS. 3A to 3C. In the image sensor illustrated in FIGS. 3A to 3C, a plurality of unit pixel cells P are arranged, each unit pixel cell P including a pixel A and a pixel B disposed separate from each other under a single microlens. The pixel A and the pixel B disposed under the microlens are pupil-divided pixels that take the microlens as an exit pupil. In other words, the photoelectric conversion units in the pixel A and the pixel B receive light beams passing through different partial pupil regions of the exit pupil of the optical imaging system.

When an A image pixel output and a B image pixel output constituted by the pixels A and the pixels B are respectively combined in a column direction (or a row direction), and an A image and a B image are generated as outputs from same-color unit pixel cell groups and converted to data, displacement between the respective corresponding points is as follows:

when in focus, the position at which the optical imaging system forms the image is the PDs under the microlens of a unit pixel cell P7, and thus the A image pixel group and the B image pixel group substantially match. At this time, a parallax amount between the A image pixel group and the B image pixel group, found through a correlation computation, is expressed as being approximately 0.

in rear focus, as the positions where the optical imaging system forms the image, the A image pixel is the pixel under the microlens of a unit pixel cell P5, and the B image pixel is the pixel under the microlens of a unit pixel cell P9. At this time, a parallax amount d(b) arises between the A image pixel group and the B image pixel group.

in front focus, as the positions where the optical imaging system forms the image, the A image pixel is the pixel under the microlens of the unit pixel cell P9, and the B image pixel is the pixel under the microlens of a unit pixel cell P5. At this time, a parallax amount d(c), which is in the opposite direction from that during rear focus, arises between the A image pixel group and the B image pixel group.

This means that when in focus, the A image pixel group and the B image pixel group see the same object, but during rear focus and front focus, the A image pixel group and the B image pixel group see objects between which a parallax amount is present. By using an image displacement amount calculating unit 105 (described later) to find the parallax amount for each region obtained by dividing the image sensor, a defocus amount can be calculated for each of the division regions.

Referring again to FIG. 1, the A/D conversion unit 103 converts an analog electrical signal, output from the image sensor 102 after the analog signals have been processed by an analog signal processing unit (not shown), into a digital electrical signal (a pixel signal), and outputs the digital electrical signal to a capture unit 104. The analog signal processing unit (not shown) is constituted by a CDS circuit that removes noise in transmission paths, a nonlinear amplifying circuit, and the like.

The capture unit 104 determines an active period and type of the pixel signal, judges whether the pixel corresponds to an A image signal period or an A+B image signal period, adds an identifying signal, and outputs the resulting signal to a digital signal processing unit 108 and the image displacement amount calculating unit 105. In the present embodiment, the digital signal processing unit 108 does not use a parallax image, and thus it is acceptable for only pixel values corresponding to the A+B image signal to be output to the digital signal processing unit 108.

The digital signal processing unit 108 carries out digital signal processing such as synchronization processing, gamma processing, and noise reduction processing on the image input as a Bayer pattern, and outputs an image undergoing live view exposure, an image of a still image frame, or the like to a display image generating unit 109. The image of the still image frame is also output to an external recording apparatus 110.

The external recording apparatus 110 records the image of the still image frame, output from the digital signal processing unit 108, into Flash memory such as an SD card. Additionally, the external recording apparatus 110 adds the output of a defocus image generating unit 106 (described later) to the captured image and records that output as metadata.

The image displacement amount calculating unit 105 generates a B image signal on the basis of the input A image signal and A+B image signal, and carries out a correlation computation. The image displacement amount calculating unit 105 calculates an extremum position for each region on the basis of the correlation computation result, and outputs the extremum positions as an image displacement map. The image displacement map is output to the defocus image generating unit 106 and a lens driving control unit 107.

Figure 4:
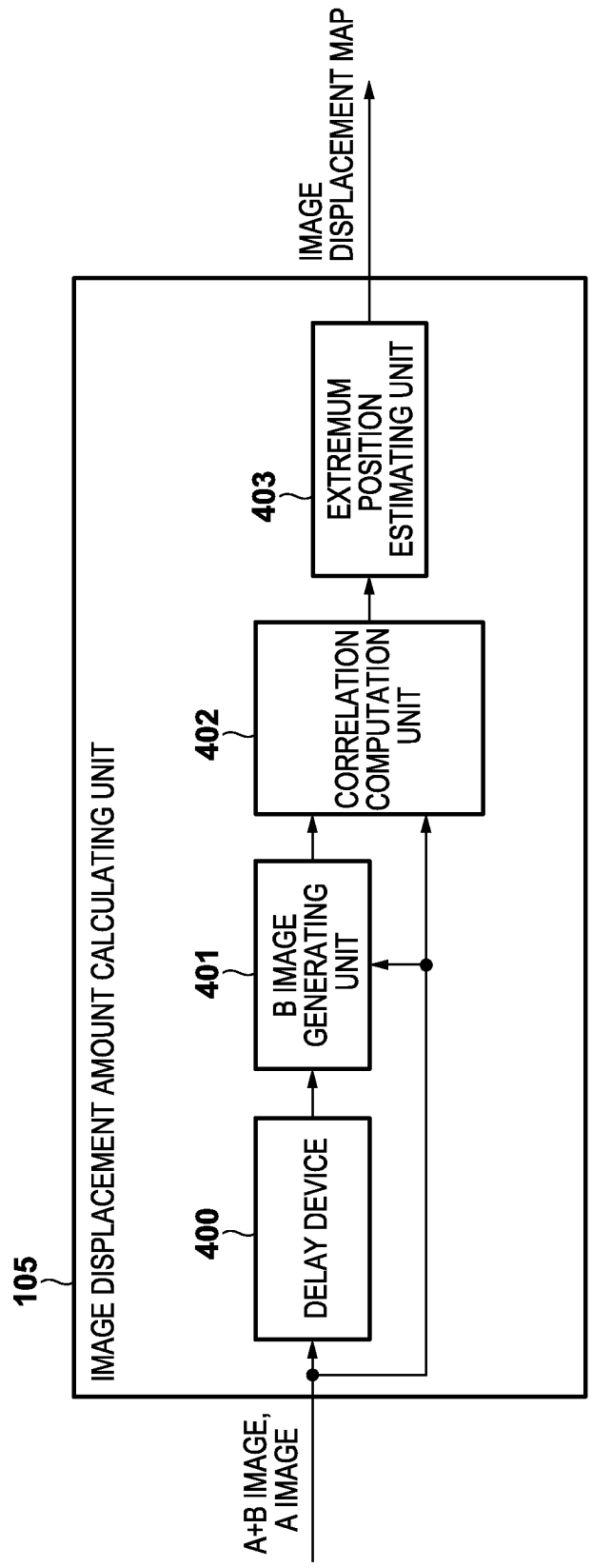
FIG. 4 is a diagram illustrating the configuration of an image displacement amount calculating unit 105.

The configuration of the image displacement amount calculating unit 105 will be described next with reference to FIG. 4. The image displacement amount calculating unit 105 includes a delay device 400, a B image generating unit 401, a correlation computation unit 402, and an extremum position estimating unit 403.

To synchronize the A image signal and the A+B image signal input at different timings, the delay device 400 delays the A image signal, which is non-destructively read out first. The delay device 400 may be constituted by a flip-flop, or may be constituted by a storage device such as SRAM or DRAM.

The B image generating unit 401 generates the B image signal by subtracting the A image signal synchronized by the delay device 400 from the A+B image signal.

The correlation computation unit 402 uses correlation computation processing such as SAD or SSD to calculate a correlation amount for each of regions obtained by dividing the image sensor 102 into rectangular blocks. In the present embodiment, a correlation amount using SAD is assumed to be calculated according to the following Expression 1.

$$C(m)=\Sigma |YAn(i)-YBn(i+m)| \qquad (1)$$

Here, YAn and YBn are numerical sequences including a number of pixels in n microlenses in the horizontal direction, described with reference to FIGS. 3A to 3C. i represents each of pixel positions. m represents a shift amount for calculating an absolute value of a difference while shifting pixels. By changing the value of m from negative to positive, an array of correlation computation results corresponding to object positions in a depth direction can be calculated.

The extremum position estimating unit 403 estimates an extremum position N from the array of correlation computation results using equiangular line fitting. The extremum position N is calculated for each region obtained by dividing the image sensor 102 into rectangular regions, and the extremum positions N are output as an image displacement map.

When using SAD, it is desirable that the extremum position N be calculated using equiangular line fitting, but it should be noted that the present embodiment is not limited to this method. For example, the position having the lowest correlation amount in the array of correlation computation results may be taken as the extremum position N. Additionally, if SSD is used as the correlation computation, the extremum position N may be estimated using parabola fitting.

Referring again to FIG. 1, the lens driving control unit 107 selects, from the image displacement map output from the image displacement amount calculating unit 105, an extremum position N corresponding to an image height position of an object obtained by an object position specifying unit such as a face detecting unit (not shown). The lens driving control unit 107 finds a defocus amount d on the basis of the selected extremum position N, and drives the focus lens of the optical system unit 101 on the basis of the defocus amount d. Additionally, the lens driving control unit 107 outputs the selected extremum position N to the defocus image generating unit 106.

The defocus amount d can be found using a known technique. For example, the defocus amount d can be found through the following Expression 2, using the extremum position N and a value K uniquely determined by the optical state up to the light-receiving element.

$$d=N \times K \qquad (2)$$

Although the present embodiment describes the lens driving control unit 107 as outputting the extremum position N to the defocus image generating unit 106, the present embodiment is not limited to this configuration. For example, the lens driving control unit 107 may read out the state of the optical system unit 101, after the focus lens has been driven, from the optical system unit 101, and output that state to the defocus image generating unit 106. In such a case, the lens driving control unit 107 may convert the defocus amount to an extremum position N corresponding to the image displacement amount and output that extremum position N.

The defocus image generating unit 106 converts the image displacement map output from the image displacement amount calculating unit 105 into a defocus image, and outputs the defocus image to the display image generating unit 109 and the external recording apparatus 110. As described earlier, during still image shooting, the A image signal is not read out, and the image displacement map is not generated by the image displacement amount calculating unit 105. In this case, the defocus image generating unit 106 generates (estimates) an image displacement map for the current frame on the basis of the image displacement map from the previous frame and the extremum position N used to calculate the defocus amount d corresponding to the focus lens driving amount from the previous frame to the current frame.

Figure 6:
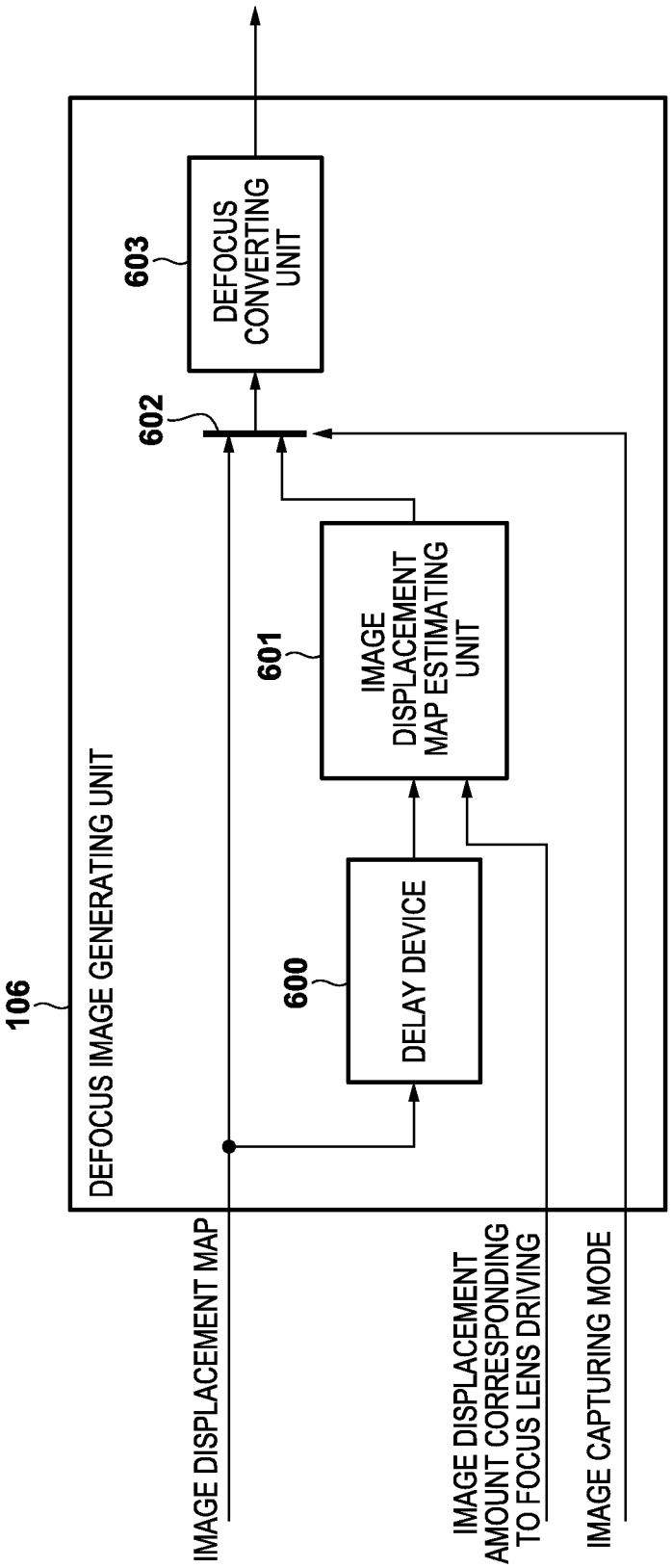
FIG. 6 is a diagram illustrating the configuration of a defocus image generating unit 106 according to the first embodiment.

The configuration of the defocus image generating unit 106 will be described next with reference to FIG. 6. The defocus image generating unit 106 includes a delay device 600, an image displacement map estimating unit 601, a map selecting unit 602, and a defocus converting unit 603.

The delay device 600 is a delay device that holds the image displacement map output from the image displacement amount calculating unit 105. In the present embodiment, the delay device 600 holds an image displacement map corresponding to a plurality of extremum positions from one frame previous, the image displacement map having been generated on the basis of the A image and the A+B image read out during live view exposure.

The image displacement map estimating unit 601 estimates the image displacement map of the current frame, which is a still image frame, on the basis of the extremum position N output from the lens driving control unit 107 (an image displacement amount corresponding to focus lens driving) and the image displacement map output from the delay device 600. For example, the image displacement map estimating unit 601 subtracts the value of N, as an offset value, from each extremum position in the image displacement map output from the delay device 600.

The map selecting unit 602 selects the image displacement map to be output in accordance with whether an image capturing mode is a live view mode or a recording mode. The live view mode is a mode in which image capturing which reads out both the A image signal and the A+B image signal is carried out to display a live view, whereas the recording mode is a mode in which image capturing which reads out the A+B image signal but does not read out the A image signal is carried out to generate a still image frame for recording. When the mode is the live view mode, the map selecting unit 602 selects the image displacement map output from the image displacement amount calculating unit 105, and when the mode is the recording mode, the map selecting unit 602 selects the image displacement map output from the image displacement map estimating unit 601. The map selecting unit 602 outputs the selected image displacement map to the defocus converting unit 603.

The defocus converting unit 603 converts the values at the extremum positions in the input image displacement map into pixel values in a defocus image. For example, when an extremum position detection range is −n to +n, the range which the extremum positions N can take on is −n to +n. In such a case, assuming the pixel values in the defocus image have a bit number of m, the extremum position N can be converted into a pixel value Pixn by applying the following Expression 3.

$$Pixn = \{(N+n)/2n\} \times (2^m - 1) \quad (3)$$

A grayscale defocus image can be generated by using the pixel value Pixn found through such a calculation as a luminance value and fixing a color signal to 0. In this case, of pixel values from 0 to 255, a range from 127 to 128 is in focus, while 0 indicates the near end or infinity and 255 indicates infinity or the near end. Which of 0 and 255 indicates the near end or infinity depends on the displacement direction when carrying out the correlation computation while displacing the pixels.

Although the foregoing describes the defocus image as being a grayscale image, the present embodiment is not limited to this configuration. For example, the defocus image may be generated such that the value of green is increased as the image is closer to being in focus, with the near end corresponding to blue and infinity corresponding to red. Alternatively, the image may be generated such that a specific color becomes darker as the image is closer to being in focus, and becomes more achromatic as the image moves away from being in focus. Or, a meta image in which the value of the alpha channel is set to a minimum value or a maximum value as the image is closer to being in focus may be generated as the defocus image.

Additionally, although the foregoing describes using the extremum position N used to calculate the defocus amount d corresponding to the focus lens driving amount as the offset value for estimating the image displacement amount of the still image frame, another type of information may be used as long as it is information indicating displacement in the optical system state.

For example, there are cases where the F number corresponds to full aperture during live view operations, but is increased to a user-designated value during still image shooting. In such a case, normalizing on the basis of the displacement in the F number makes it possible to generate a defocus image indicating the focus range of the still image.

Additionally, with a lens such as a varifocal lens, the focal position displaces at the zoom position of the optical system. When such a lens is attached, an offset amount may be added on the basis of the zoom position of the still image frame.

Additionally, with a typical optical system unit, slight focal length fluctuations arise depending on the image height position, and thus the offset amount may be changed depending on the image height position.

Referring again to FIG. 1, the display image generating unit 109 generates a user notification image on the basis of the outputs of the digital signal processing unit 108 and the defocus image generating unit 106, and outputs the user notification image to an external display apparatus such as a liquid crystal display (not shown).

A control unit 111 includes ROM storing a control program and RAM used as working memory, and controls the various units of the image capturing apparatus 100 by executing the control program.

Figure 5:
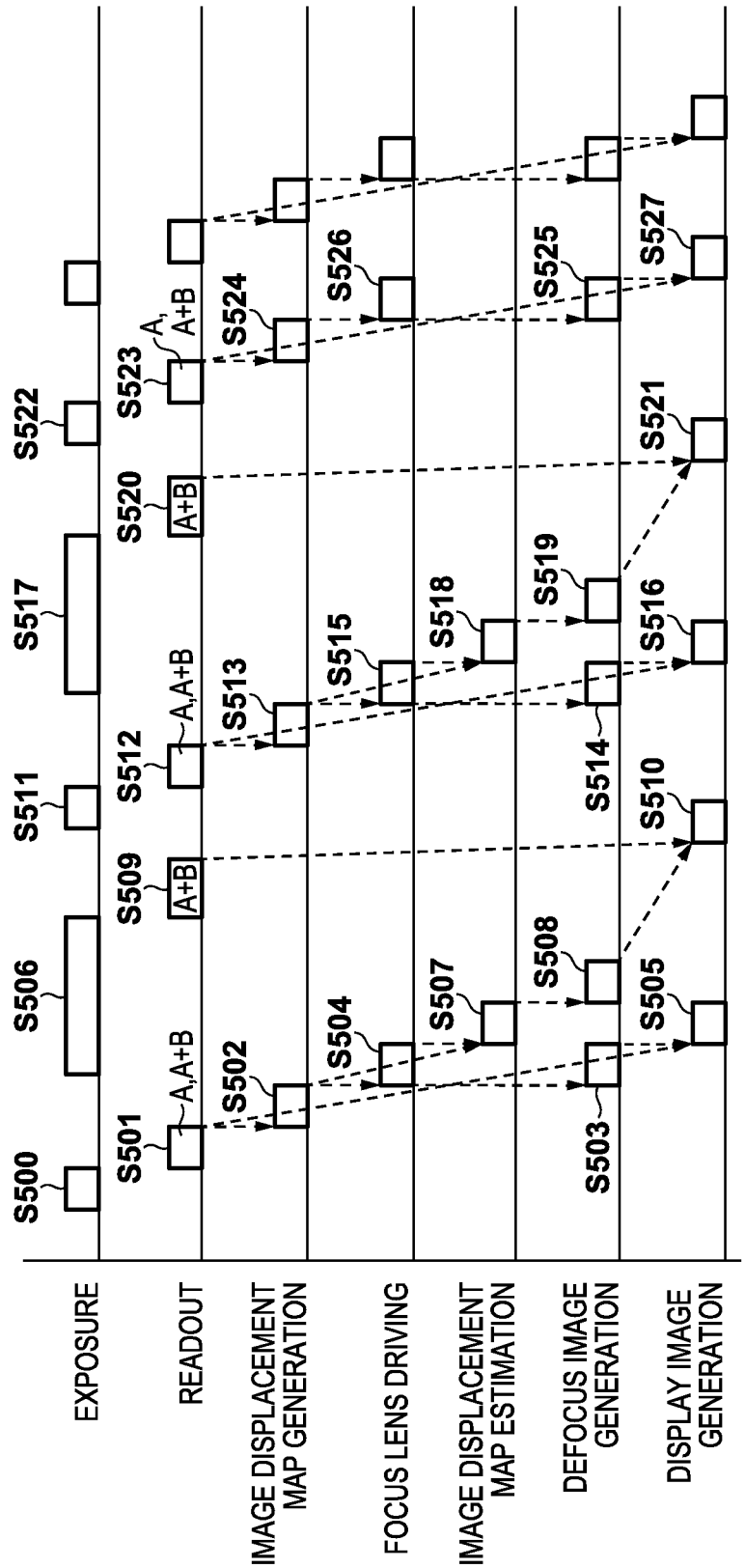
FIG. 5 is a timing chart illustrating continuous shooting processing executed by the image capturing apparatus 100 according to the first embodiment.

FIG. 5 is a timing chart illustrating continuous shooting processing executed by the image capturing apparatus 100. Unless otherwise specified, the processing of each step in the timing chart is realized by the control unit 111 controlling the respective units of the image capturing apparatus 100 in accordance with the control program.

In step S500, the image sensor 102 carries out exposure in the live view mode. In step S501, the image sensor 102 ends the exposure, reads out the A image signal non-destructively, and then reads out the A+B image signal destructively. Note that the readout of the A image signal and the A+B image signal may be switched from frame to frame or from line to line.

In step S502, the image displacement amount calculating unit 105 generates the image displacement map on the basis of the A image signal and the A+B image signal read out in step S501. In step S503, the defocus image generating unit 106 generates the defocus image on the basis of the image displacement map generated in step S502.

In step S504, the lens driving control unit 107 selects the extremum position N on the basis of the image displacement map generated in step S502, calculates the defocus amount d on the basis of the extremum position N, and drives the focus lens of the optical system unit 101 on the basis of the defocus amount d.

In step S505, the display image generating unit 109 generates a display image on the basis of the image generated by the digital signal processing unit 108 on the basis of the A+B image, and the defocus image generated by the defocus image generating unit 106. The display image generating unit 109 outputs the display image to the external display apparatus (not shown). The user can therefore be notified of the shooting conditions.

In step S506, the image sensor 102 carries out exposure in the recording mode. In step S507, the defocus image generating unit 106 estimates the image displacement map on the basis of the image displacement map generated in step S502 and the extremum position N for focus lens driving, which has been selected by the lens driving control unit 107 in step S504. Through this estimation, an image displacement map corresponding to the still image frame in the recording mode, where the A image is not read out, is generated.

In step S508, the defocus image generating unit 106 generates the defocus image on the basis of the image displacement map generated (estimated) in step S507. Through this, a defocus image corresponding to the still image frame in the recording mode, where the A image is not read out, is generated.

In step S509, the image sensor 102 ends the exposure, and reads out the A+B image signal destructively without reading out the A image signal. In other words, in the still image shooting, the control unit 111 carries out control for reading out mixed signals from the entirety of the plurality of photoelectric conversion units, without carrying out control for reading out signals from some of the plurality of photoelectric conversion units individually.

In step S510, the display image generating unit 109 generates a display image on the basis of a still image for recording, generated by the digital signal processing unit 108 on the basis of the A+B image read out in step S509, and the defocus image generated in step S508. The display image generating unit 109 outputs the display image to the external display apparatus (not shown). Through this, both the defocus image and the still image for recording can be displayed even when in the recording mode, in which the A image is not read out, and the user can be notified of the shooting conditions. Additionally, the external recording apparatus 110 may record the defocus image and the still image for recording in association with each other.

The processing of steps S511 to S521 is the same as the processing of steps S500 to S510, and the same processing is repeatedly executed until the user makes an instruction to stop the continuous shooting to the control unit 111.

The processing of steps S522 to S527 is repeatedly executed after the instruction to stop recording has been made. The processing of steps S522 to S527 is similar to the processing of steps S500 to S505. Here, the image displacement map estimation is not carried out.

Although the present embodiment describes a configuration in which the image displacement map and the defocus image (the defocus map) are generated, the configuration is not limited thereto. The technique of the present embodiment can be used to generate a variety of information expressing depth (depth information) from viewpoint images. The depth information is, for example, distribution information of the parallax amount in a pupil-divided image (a parallax map, an image displacement map), distribution information indicating a relative positional relationship between objects with respect to the depth direction, and so on. The same applies to the second and subsequent embodiments.

As described thus far, according to the first embodiment, the image capturing apparatus 100 generates an image displacement map (first depth information) on the basis of a plurality of viewpoint images having mutually-different viewpoints, the viewpoint images having been obtained from live view shooting (first shooting). Then, the image capturing apparatus 100 corrects the image displacement map (the first depth information) generated on the basis of the plurality of viewpoint images so as to reflect a change in depth resulting from a difference in focal distances of the live view shooting and still image shooting (second shooting). Through this, the image capturing apparatus 100 generates an image displacement map (second depth information) for an image obtained from the still image shooting (a captured image).

According to this configuration, it becomes possible, when generating depth information (e.g., an image displacement map) corresponding to a given shooting timing from depth information corresponding to a specific shooting timing, to reflect a change in depth caused by a difference in a focal distance.

The foregoing describes a configuration in which the image capturing apparatus 100 uses a driving amount of the focus lens (a focus adjustment lens) between live view shooting and still image shooting in order to reflect a change in depth resulting from a difference in focal distances. To be more specific, the image capturing apparatus 100 uses the extremum position N (depth information) used to determine the driving amount of the focus adjustment lens during focus adjustment control. However, the present embodiment is not limited to this configuration, and the image capturing apparatus 100 can use at least one of a change in F number, the driving amount of the focus adjustment lens, and a change in zoom position between the live view shooting and the still image shooting.

Additionally, the foregoing describes the image capturing apparatus 100 as using an image displacement map corresponding to the live view shooting carried out immediately before in order to generate (estimate) the image displacement map corresponding to still image shooting. However, the relationship between the timings of the still image shooting and the live view shooting is not limited to that described above, and for example, an image displacement map corresponding to live view shooting carried out after the still image shooting may be used. Regardless of the relationship between the timings of the still image shooting and the live view shooting, the image capturing apparatus 100 may correct the image displacement map corresponding to the live view shooting so as to reflect a change in depth resulting from a difference in focal distances in the live view shooting and still image shooting.

Although in the present embodiment, the depth information of the still image is estimated on the basis of the extremum position where the driving amount of the focus lens is determined and the depth information of the previous frame, it is not absolutely necessary to use the extremum position. For example, obtaining an offset value using a result of dividing the focus lens driving amount by the K value is equivalent as processing.

Additionally, in the present embodiment, the A image signal and the A+B image signal are read out in the live view frame, and the A+B image signal is read out in the still image frame; however, the present embodiment is not limited to this configuration. For example, the A image signal and the B image signal may be read out individually in the live view frame, and the A+B image signal may be read out in the still image frame. In such a case, a display image for the live view frame can be generated by the digital signal processing unit 108 adding the A image signal and the B image signal, and then displaying the result.

Second Embodiment

The first embodiment described a configuration in which the depth information corresponding to the still image shooting is generated (estimated) on the basis of the depth information (the image displacement map) corresponding to a single instance of live view shooting. However, the second embodiment will describe a configuration in which the depth information corresponding to the still image shooting is generated (estimated) on the basis of the depth information corresponding to multiple instances (two instances, in the following descriptions) of live view shooting, in order to obtain more accurate depth information.

In the second embodiment, the basic configuration of the image capturing apparatus 100 is the same as in the first embodiment (FIG. 1), but the configuration of the defocus image generating unit 106 is different from that of the first embodiment. The following will primarily describe areas that are different from the first embodiment.

Figure 9:
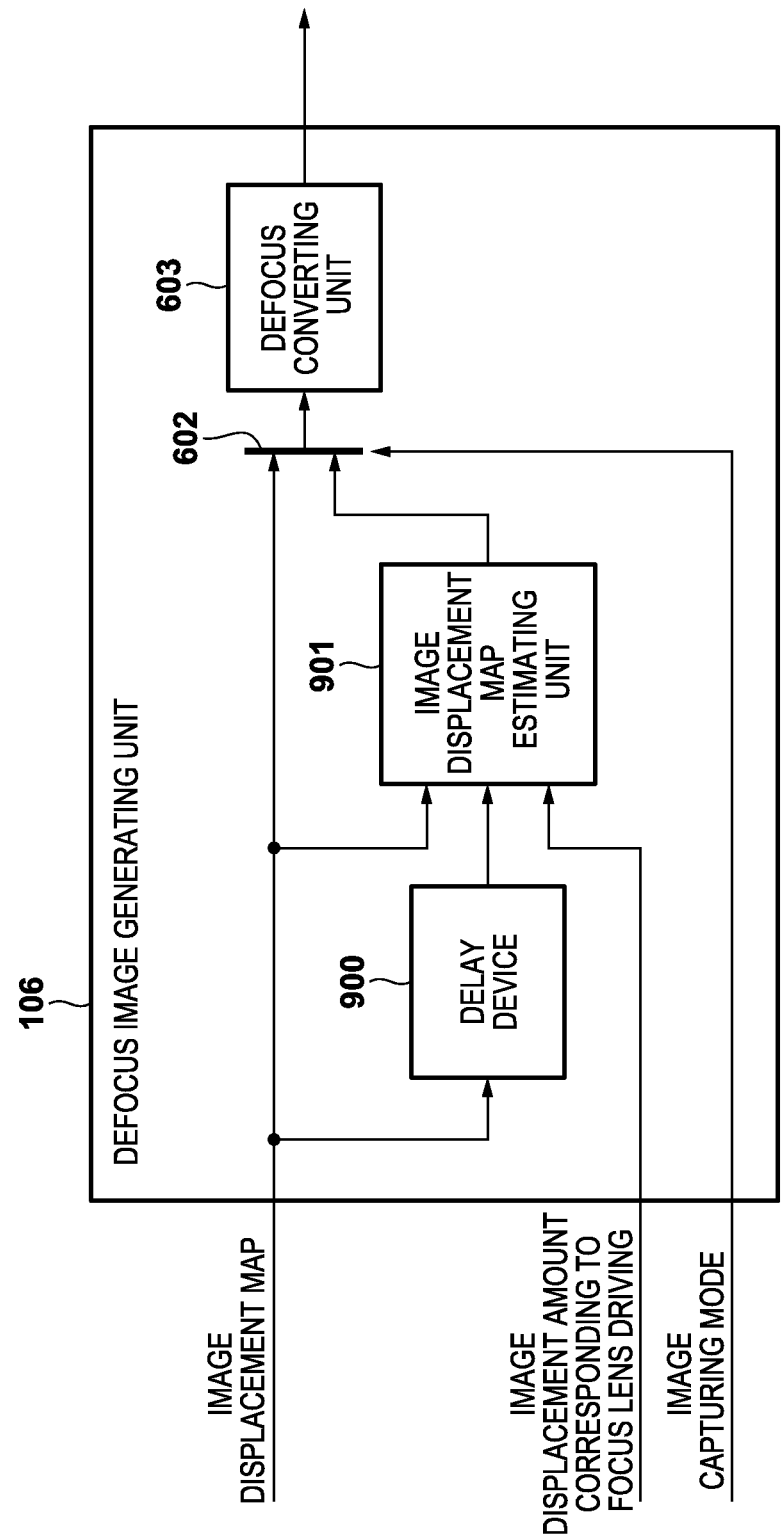
FIG. 9 is a block diagram illustrating the configuration of a defocus image generating unit 106 according to the second embodiment.

FIG. 9 is a block diagram illustrating the configuration of the defocus image generating unit 106 according to the second embodiment. A delay device 900 is a delay device that holds the image displacement map output from the image displacement amount calculating unit 105. In the present embodiment, the delay device 900 holds an image displacement map generated on the basis of the A image and the A+B image read out during live view exposure, until the timing of the exposure carried out for the next live view (in the following, this is assumed to be the timing of the frame two frames later).

An image displacement map estimating unit 901 estimates the image displacement map of the frame one frame previous, which is the still image frame, on the basis of the extremum position in each of regions of the current frame, and the extremum position in each of regions in the frame two frames previous, which has been delayed by the delay device 900. At the time of this estimation, the image displacement map estimating unit 901 uses the extremum positions N pertaining to a history of focus lens driving amounts used from the frame two frames previous to the current frame, output from the lens driving control unit 107.

FIG. 8 is a block diagram illustrating the configuration of the image displacement map estimating unit 901. In the focus lens driving amount history, the extremum position of the current frame is represented by N(0), the extremum position of the frame one frame previous (during still image exposure) is represented by N(−1), and the extremum position of the frame two frames previous (during live view exposure) is represented by N(−2).

An image displacement map offset correcting unit 800 adds N(−2) to the image displacement map of the current frame as an offset value. Through this, an image displacement map in which the focus lens driving amounts from the frame two frames previous to the current frame have been subtracted can be obtained.

An image displacement map predicting unit 801 finds the extremum position of each of regions in the frame one frame previous (during still image exposure) through interpolation, on the basis of the extremum position information of each region in the current frame and the extremum position information of each region in the frame two frames previous.

An image displacement map offset correcting unit 802 estimates the extremum position of each of regions in the still image frame (an image displacement map) by subtracting N(−1), as an offset value, from the extremum position in each of the regions, found through interpolation.

Figure 7:
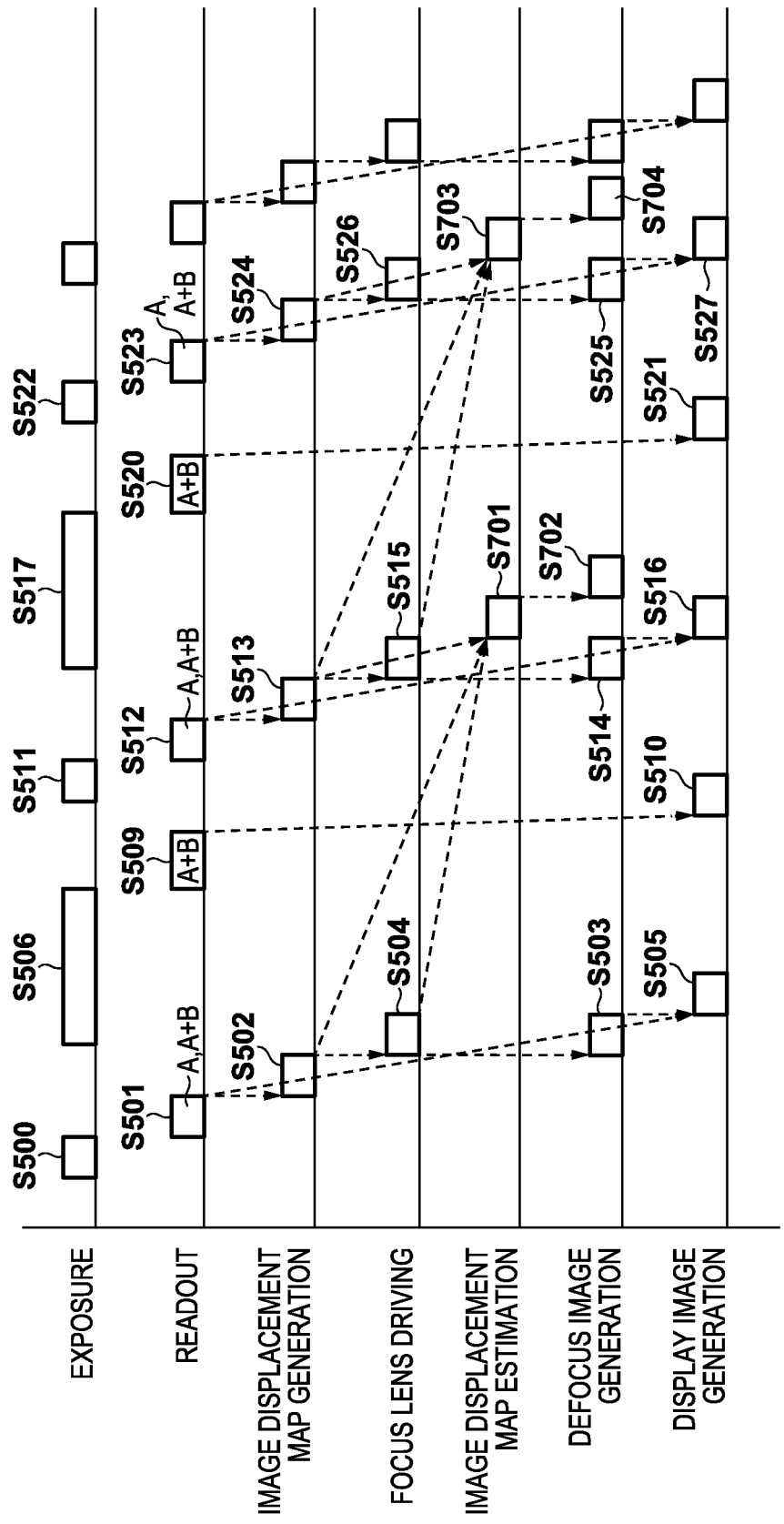
FIG. 7 is a timing chart illustrating continuous shooting processing executed by the image capturing apparatus 100 according to the second embodiment.

FIG. 7 is a timing chart illustrating continuous shooting processing executed by the image capturing apparatus 100. Unless otherwise specified, the processing of each step in the timing chart is realized by the control unit 111 controlling the respective units of the image capturing apparatus 100 in accordance with the control program. In FIG. 7, steps that perform processes identical or similar to those in FIG. 5 are given the same reference numerals as in FIG. 5.

In step S701, the image displacement map estimating unit 901 estimates (generates) the image displacement map of the frame one frame previous ("frame 2" hereinafter) from the image displacement map of the frame two frames previous ("frame 1" hereinafter) and the image displacement map of the current frame ("frame 3" hereinafter). This estimation is carried out on the basis of the history of the focus lens driving amounts from frame 1 to frame 3, and the timing differences between the respective instances of shooting from frame 1 to frame 3.

Figure 8A:
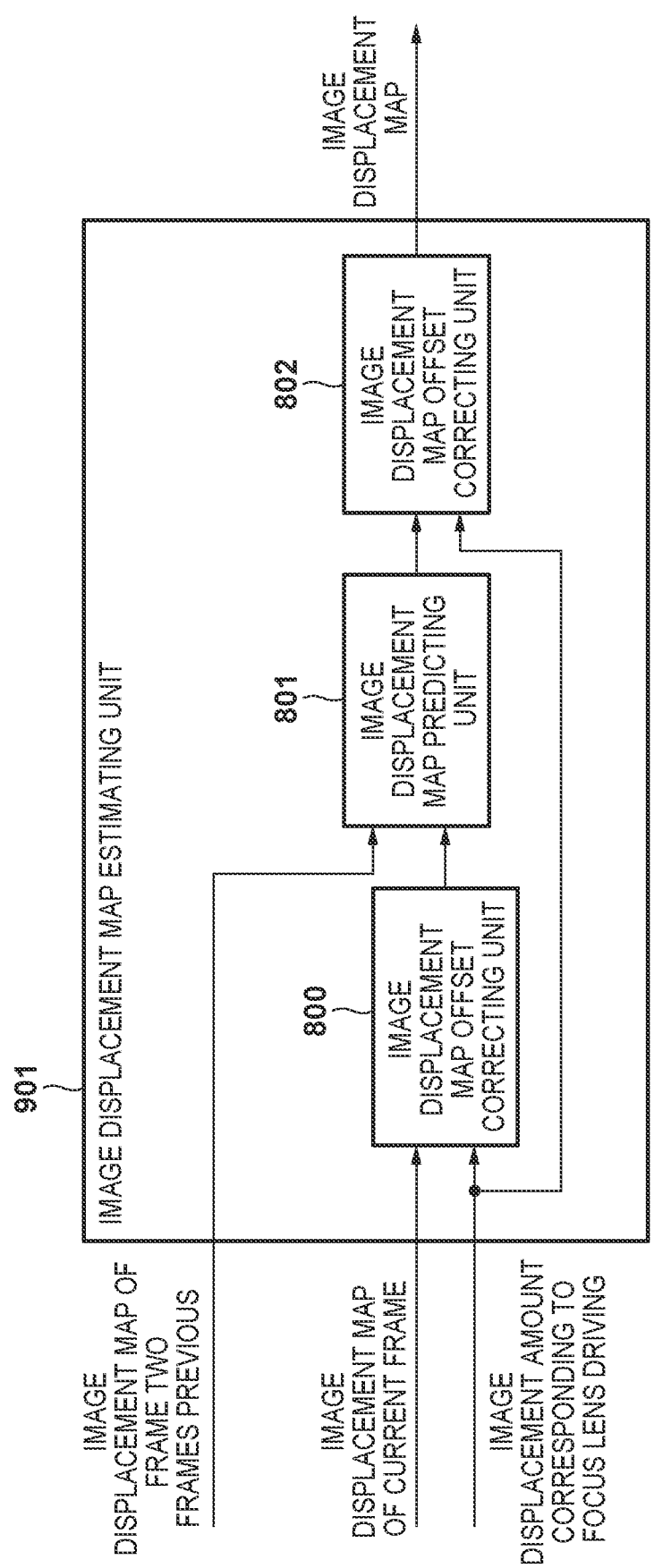
FIG. 8A is a block diagram illustrating the configuration of an image displacement map estimating unit 901.
Figure 8B:
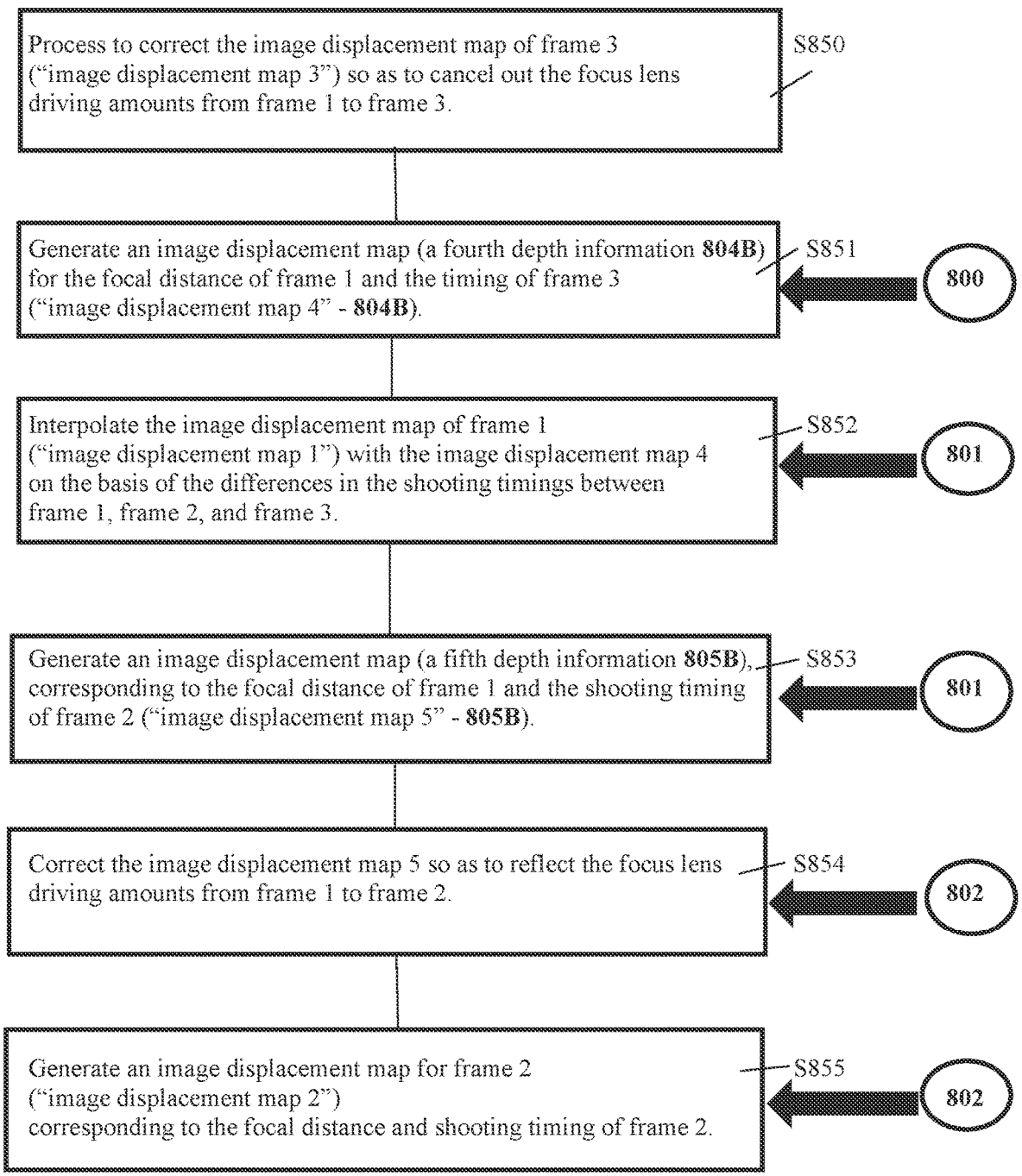
FIG. 8B is a flow chart illustrating an example of generation of a fourth depth information by the image displacement map offset correcting unit and a fifth depth information by the image displacement map predicting unit, so as to cancel out the focus lens driving amounts from frame 1 to frame 3 in accordance with at least one embodiment of the invention.

Referring to FIGS. 8A and 8B, the image displacement map offset correcting unit 800 corrects the image displacement map of frame 3 ("image displacement map 3" hereinafter) so as to cancel out the focus lens driving amounts from frame 1 to frame 3 (shown as a process S850 in FIG. 8B). Through this, the image displacement map offset correcting unit 800 generates in step S851 in FIG. 8B) an image displacement map, which is an example of a fourth depth information 804, for the focal distance of frame 1 and the timing of frame 3 ("image displacement map 4" 804B hereinafter). Next, the image displacement map predicting unit 801 interpolates in step S852 in FIG. 8B) the image displacement map of frame 1 ("image displacement map 1" hereinafter) with the image displacement map 4 on the basis of the differences in the shooting timings between frame 1, frame 2, and frame 3. Through this, the image displacement map predicting unit 801 generates in step S853 in FIG. 8B) an image displacement map, which is an example of a fifth depth information 805B, corresponding to the focal distance of frame 1 and the shooting timing of frame 2 ("image displacement map 5" 805B hereinafter). Next, the image displacement map offset correcting unit 802 corrects (in step S854 in FIG. 8B) the image displacement map 5 so as to reflect the focus lens driving amounts from frame 1 to frame 2. Through this, the image displacement map offset correcting unit 802 generates in step S855 in FIG. 8B) an image displacement map for frame 2 ("image displacement map 2" hereinafter) corresponding to the focal distance and shooting timing of frame 2.

Figure 8C:
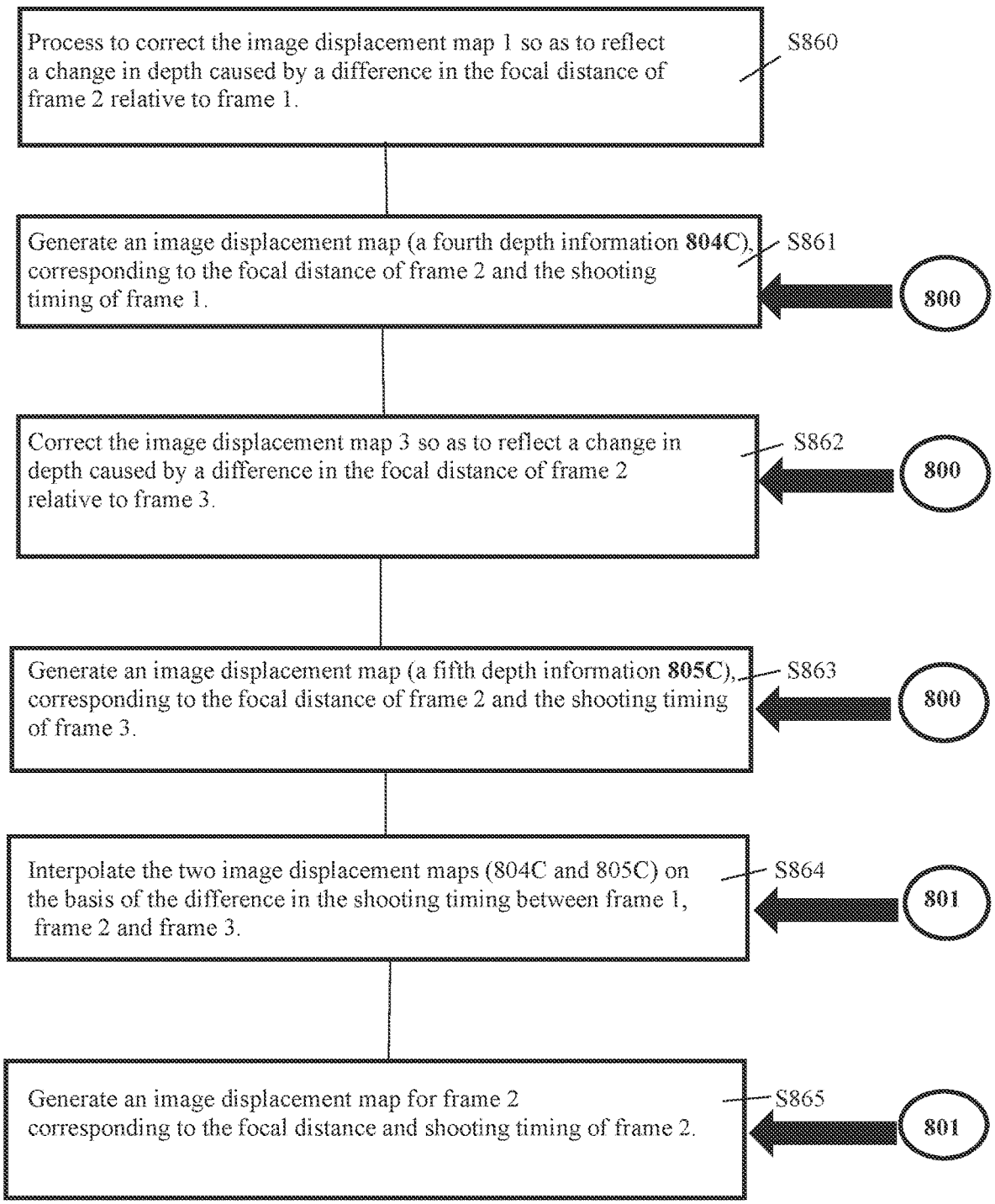
FIG. 8C is a flow chart illustrating another example of generation of a fourth depth information by the image displacement map offset correcting unit and a fifth depth information by the image displacement map predicting unit, so as to reflect a change in depth caused by a difference in the focal distance of frame 2 relative to frame 1, in accordance with at least one embodiment of the invention.
Figure 8D:
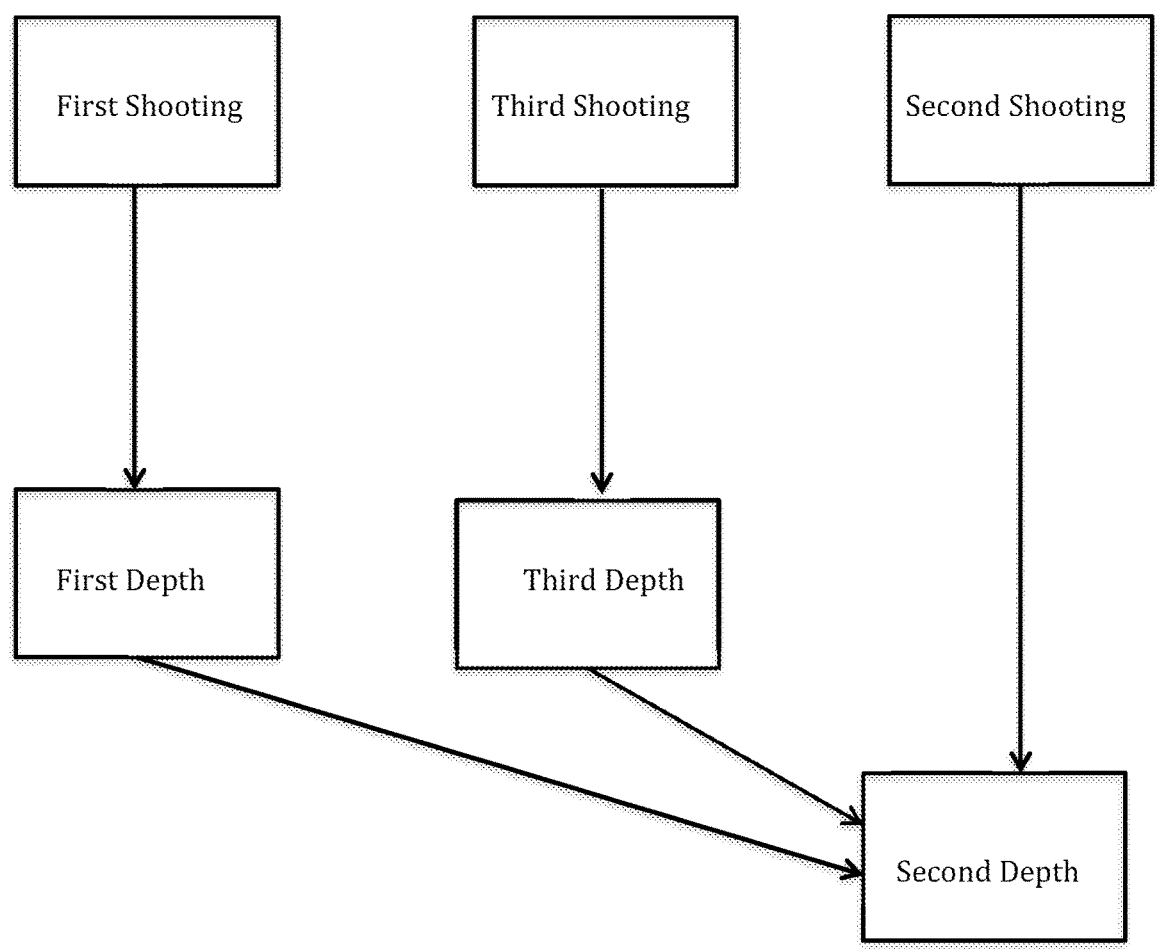
FIG. 8D is a depiction of the relationship between the first shooting, second shooting and third shooting and the first, second and third depth information in at least one embodiment of the invention.
Figure 8E:
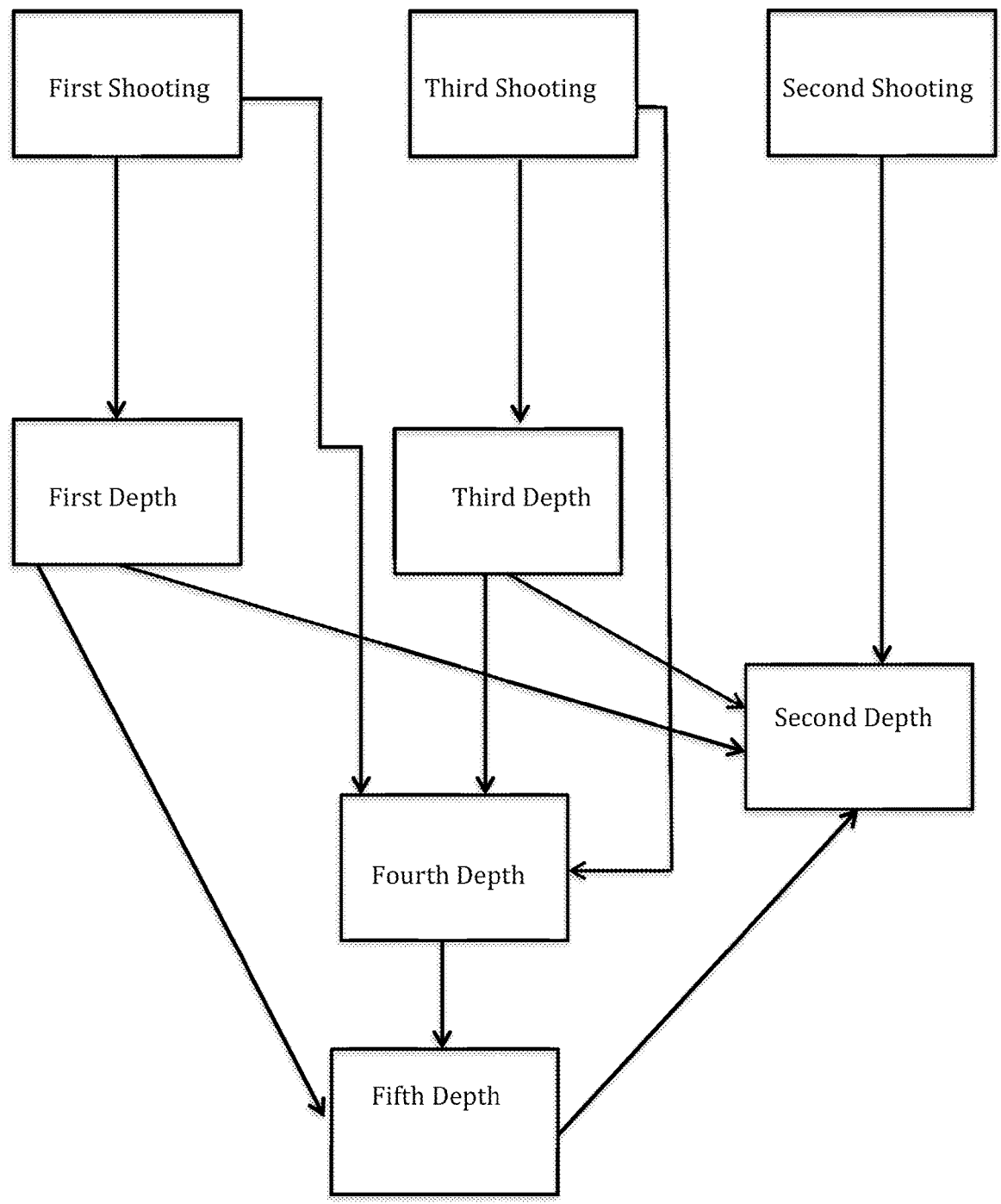
FIG. 8E is a depiction of the relationship between the first shooting, second shooting and third shooting and the first, second, third, fourth and fifth depth information in at least one embodiment of the invention.

Note that the image displacement map may be estimated (generated) through a different procedure, as illustrated with reference to FIGS. 8A and 8C. For example, the image displacement map offset correcting unit 800 may correct the image displacement map 1 so as to reflect a change in depth caused by a difference in the focal distance of frame 2 relative to frame 1 (shown as a process S860 in FIG. 8C). Through this, the image displacement map offset correcting unit 800 generates in step 861 in FIG. 8C) an image displacement map, which is an example of a fourth depth information 804C, corresponding to the focal distance of frame 2 and the shooting timing of frame 1. Additionally, the image displacement map offset correcting unit 800 may correct in step 862 in FIG. 8C) the image displacement map 3 so as to reflect a change in depth caused by a difference in the focal distance of frame 2 relative to frame 3. Through this, the image displacement map offset correcting unit 800 generates fin step 863 in FIG. 8C) an image displacement map, which is an example of a fifth depth information 805C, corresponding to the focal distance of frame 2 and the shooting timing of frame 3. Next, the image displacement map predicting unit 801 interpolates fin step 864 in FIG. 8C) these two image displacement maps on the basis of the differences in the shooting timings between frame 1, frame 2, and frame 3. Through this, the image displacement map predicting unit 801 generates fin step 865 in FIG. 8C) an image displacement map for frame 2, corresponding to the focal distance and the shooting timing of frame 2.

In step S702, the defocus converting unit 603 generates the defocus image on the basis of the image displacement map generated in step S701. Although the defocus image corresponds to frame 2, unlike in the first embodiment, the defocus image is generated after step S510, and therefore cannot be used to generate a display image. Alternatively, the display image may be generated on the basis of this defocus image at a timing later than step S510. Additionally, the external recording apparatus 110 may record the defocus image and the still image for recording in association with each other.

The processing of steps S703 and S704 is the same as the processing of steps S701 and S702, and the same processing is repeatedly executed until the user makes an instruction to stop the continuous shooting to the control unit 111.

As described thus far, according to the second embodiment, the image capturing apparatus 100 generates two image displacement maps (first depth information and third depth information) on the basis of a plurality of viewpoint images having mutually-different viewpoints, the viewpoint images having been obtained from two instances of live view shooting (first shooting and third shooting). Then, from the two image displacement maps, the image capturing apparatus 100 generates an image displacement map (second depth information) for an image obtained from the still image shooting (a captured image), corresponding to a focal distance and a timing of the still image shooting. This generating is carried out on the basis of a change in depth resulting from a difference in focal distances of the two instances of live view shooting and the still image shooting (the second shooting), and on the basis of a difference between the timings of the two instances of live view shooting and the still image shooting. A more accurate image displacement map can be generated (estimated) as a result.

Although the present embodiment has described a configuration in which the depth information of the still image frame is estimated on the basis of the live view shooting carried out before and after the still image shooting, the estimation is not limited to being based on the live view shooting before and after the still image shooting. For example, if the depth information of the still image frame is estimated from the live view shooting before and after the still image shooting, the display of the depth information of the still image frame will be delayed by at least one frame. As such, the depth information of the still image frame may be generated (estimated) by carrying out processing for extrapolating the depth information from the depth information corresponding to two instances of live view shooting previous to the still image shooting. In other words, the interpolation described with reference to step S702 may be replaced with extrapolation as appropriate, in accordance with the relationship between the timing of the still image shooting and the timing of the two instances of live view shooting.

Additionally, for live view display, a defocus image for the still image frame may be generated on the basis of the image displacement map of a frame from before the exposure for the still image frame; and for image recording for the still image frame, the defocus image may be generated using the frames before and after the still image frame.

Third Embodiment

An image sensor is known in which pupil division is carried out by using an image sensor in which two pixels are arranged for each of single microlenses, and an image which is not pupil-divided can be obtained by adding the charges of the two pixels immediately after the non-destructive readout of one of the divided pixels. Japanese Patent No. 5979849 discloses such an image sensor.

The image which is not pupil-divided can be used as-is as a captured image signal. Additionally, by subtracting one of the pupil-divided images from the signal which has not been pupil-divided to find the image constituting the other half of a pair, that pair of pupil-divided images can be obtained and then used in focus detection. Although the pair of images is necessary during focus detection, reading out the pair of images during shooting causes the readout time to become too long, and thus during shooting, it is sufficient to read out, from the image sensor, only a signal obtained by adding the two pupil-divided pixels together.

Additionally, Japanese Patent No. 6198590 discloses a technique that enhances bokeh in an image by creating a defocus map using a pair of images obtained using a similar image sensor. Using the technique of Japanese Patent No. 6198590 makes it possible to change the depth while confirming an image after shooting.

However, with the aforementioned technique disclosed in Japanese Patent No. 5979849, the readout speed is accelerated by obtaining a pupil-divided image only during focus detection, and thus the technique does not apply to situations such as enhancing bokeh, as described in Japanese Patent No. 6198590. To implement an application such as that described in Japanese Patent No. 6198590, it is necessary to read out one of the pupil-divided images from the image sensor during shooting as well, which lengthens the readout time and makes it impossible to increase the speed of continuous shooting.

Accordingly, a third embodiment will describe a configuration in which a viewpoint image corresponding to a specific shooting timing is generated using viewpoint images obtained at shooting timings before and after the specific shooting timing.

Figure 10:
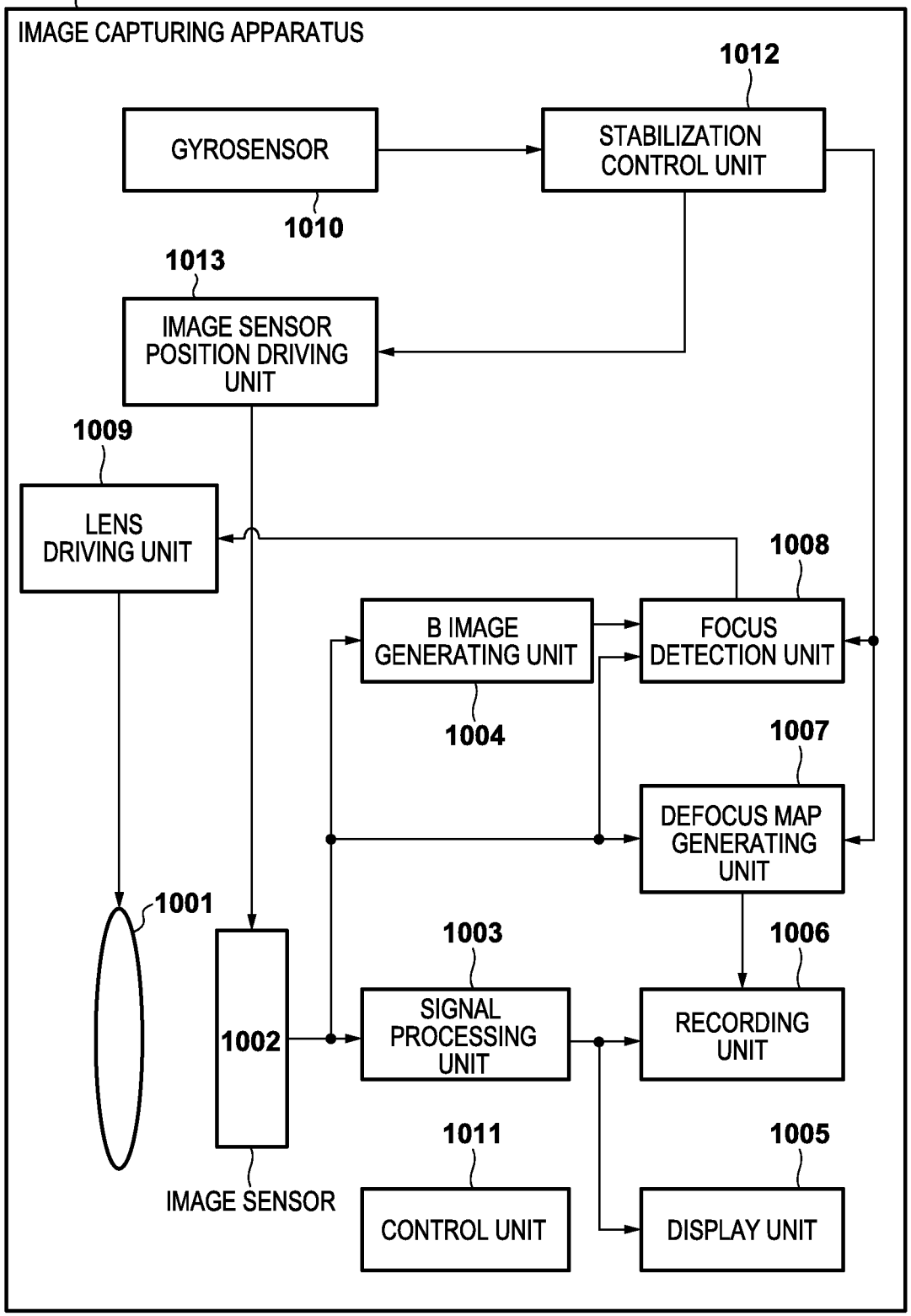
FIG. 10 is a block diagram illustrating the configuration of an image capturing apparatus 1000 according to a third embodiment and a fourth embodiment.

FIG. 10 is a block diagram illustrating the configuration of an image capturing apparatus 1000 including an image processing apparatus. In FIG. 10, 1001 indicates an optical imaging system; 1002, an image sensor; and 1003, a signal processing unit that generates an image signal from an output of the image sensor 1002. 1005 indicates a display unit that displays an output from the signal processing unit 1003, and 1006 indicates a recording unit that records the output from the signal processing unit 1003 into a recording medium. 1004 indicates a B image generating unit that accumulates the output from the image sensor 1002 and generates a B image, and 1007 indicates a defocus map generating unit that generates a defocus map on the basis of the output from the image sensor 1002. 1008 indicates a focus detection unit that carries out focus detection on the basis of outputs from the image sensor 1002 and the B image generating unit 1004, and 1009 indicates a lens driving unit that controls a lens of the optical imaging system 1001 on the basis of an output from the focus detection unit 1008.

Additionally, 1010 indicates a gyrosensor that detects an oscillation state of the image capturing apparatus 1000, and 1012 indicates a stabilization control unit that carries out control for shifting a position of the image sensor 1002 on the basis of an output from the gyrosensor 1010. 1013 indicates an image sensor position driving unit that moves the position of the image sensor 1002 under the control of the stabilization control unit 1012.

1011 indicates a control unit. The control unit 1011 includes ROM storing a control program and RAM used as working memory, and controls the various units of the image capturing apparatus 1000 by executing the control program.

Figure 11A:
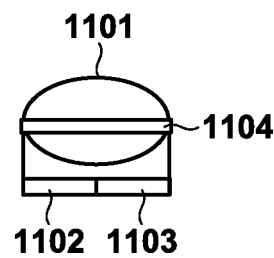
FIG. 11A is a cross-sectional view of a pixel structure in an image sensor 1002.

FIG. 11A is a cross-sectional view of a pixel structure in an image sensor 1002. 1101 indicates a microlens. 1102 indicates an A image photoelectric conversion unit that generates an A image, which is one of pupil-divided images, and 1103 indicates a B image photoelectric conversion unit that generates a B image, which is another of pupil-divided images. 1104 indicates a color filter.

Figure 11B:
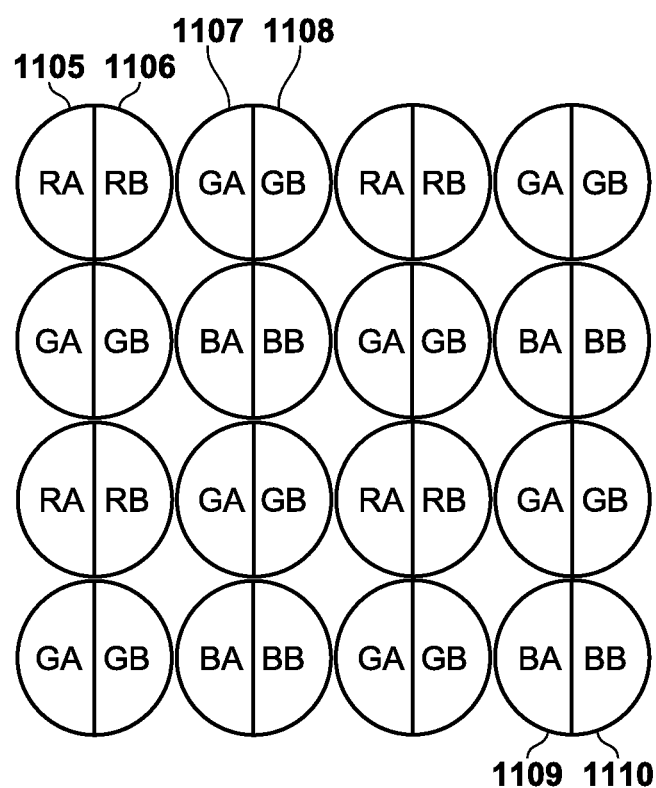
FIG. 11B is a front view of a pixel array in the image sensor 1002.

FIG. 11B is a front view of a pixel array in the image sensor 1002. 1105 indicates an A image photoelectric conversion unit for which the color filter 1104 is a red filter, and 1106 indicates a B image photoelectric conversion unit corresponding to the same red filter. 1107 indicates an A image photoelectric conversion unit corresponding to a green filter, and 1108 indicates a B image photoelectric conversion unit corresponding to the green filter. 1109 indicates an A image photoelectric conversion unit corresponding to a blue filter, and 1110 indicates a B image photoelectric conversion unit corresponding to the blue filter. In this manner, color filters are disposed in the image sensor 1002 in a Bayer pattern.

The image sensor 1002 can read out only the A image photoelectric conversion unit 1102 non-destructively, and then add the charges of the B image photoelectric conversion unit 1103 and the A image photoelectric conversion unit 1102 within the pixel and read out the resulting charge. Mixing the charges within the pixel makes it possible to obtain an output corresponding to the output of an image sensor which is not pupil-divided.

FIG. 13A is a timing chart illustrating signals output from the image sensor 1002. A period indicated by S1305 corresponds to a single horizontal period. In step S1301, the output of the A image photoelectric conversion unit 1102 is transferred, and in step S1302, a signal obtained by mixing the outputs from the A image photoelectric conversion unit 1102 and the B image photoelectric conversion unit 1103 is transferred. In this manner, an A image signal and an A+B image signal are transferred in a single horizontal period.

The A+B image is processed as-is by the signal processing unit 1003, and is then transferred to the display unit 1005 and displayed. The signal processing unit 1003 takes the signals only from the period of step S1302 included in the horizontal period indicated by S1305. On the other hand, the B image generating unit 1004 takes the signals in both the period indicated by S1301 and the period indicated by S1302. The B image generating unit 1004 delays the signals taken in the period indicated by S1301 by writing the signals into internal memory, and then reads the signals out at the timing of step S1303. In step S1304, the B image signal is generated by subtracting the delayed A image, read out in step S1303, from the A+B image input at the same timing as step S1303 (step S1302), and the B image signal is then transferred to the focus detection unit 1008 in a later stage.

The pupil-divided pair of images constituted by the A image and the B image is input to the focus detection unit 1008. The amount and direction of shift in the focus is detected by detecting image displacement between the A image and the B image in the pupil division direction. A defocus amount is obtained by multiplying the detected image displacement between the A image and the B image by a given coefficient. The focus detection unit 1008 detects the focus of an object by controlling the lens driving unit 1009 on the basis of the defocus amount.

To convert the image displacement amount into a defocus amount, it is necessary to determine a coefficient on the basis of information such as the distance to the pupil of the lens, vignetting, and the like. This information varies depending on a relative position from the optical axis of the optical imaging system 1001, and it is therefore necessary to know information of the position of the image sensor 1002 being controlled by the image sensor position driving unit 1013. When the stabilization control unit 1012 controls the image sensor position driving unit 1013 on the basis of information from the gyrosensor 1010, position information of the image sensor 1002 is transferred to the focus detection unit 1008 and the defocus map generating unit 1007 at the same time.

Note that any desired known techniques can be used as the method for finding the image displacement amount through a correlation computation, the method for finding the coefficient for conversion into a defocus amount on the basis of the pupil position of the optical imaging system 1001, and so on.

Figure 12:
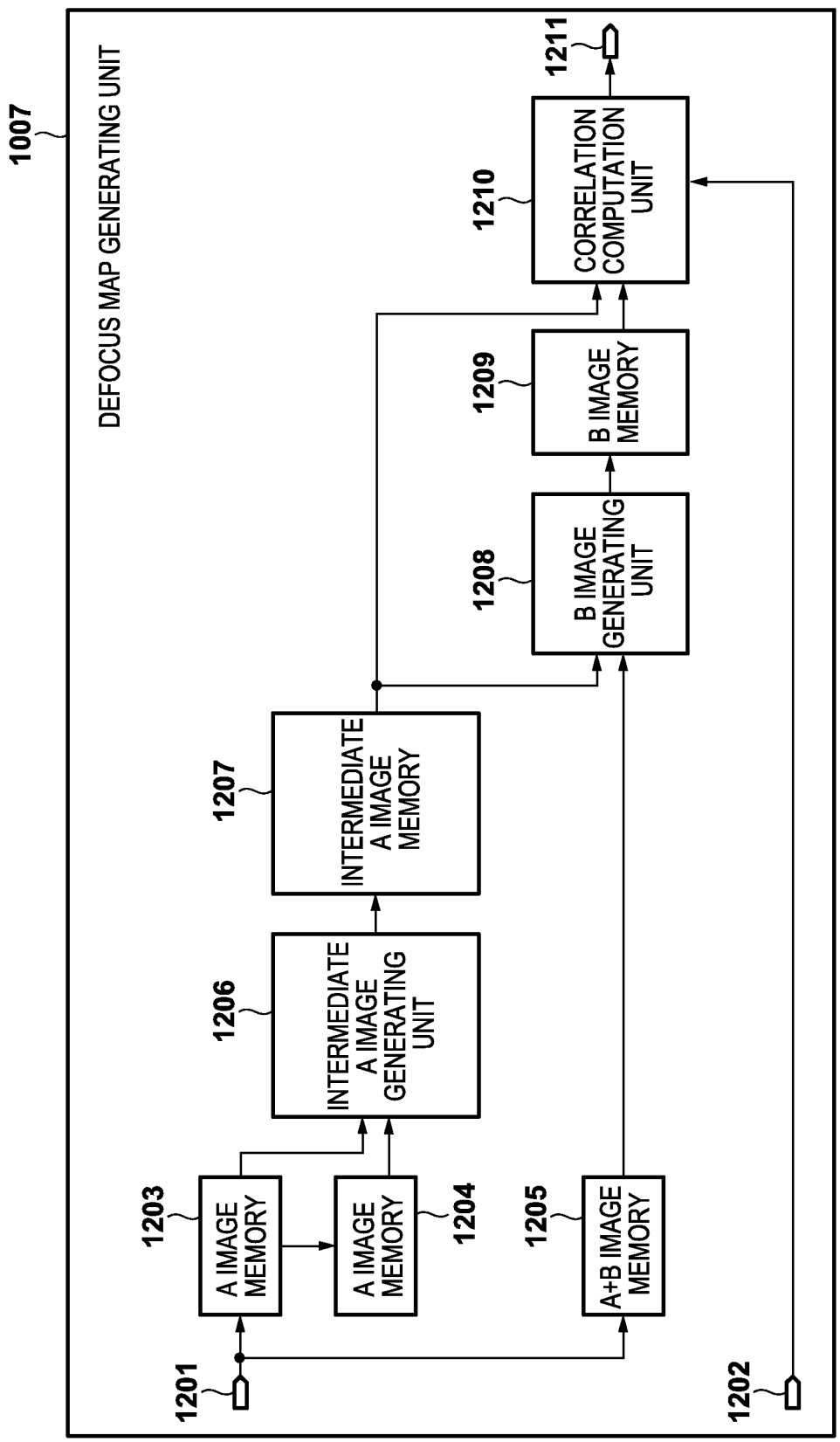
FIG. 12 is a block diagram illustrating the internal configuration of a defocus map generating unit 1007 according to the third embodiment.

FIG. 12 is a block diagram illustrating the internal configuration of the defocus map generating unit 1007 according to the third embodiment. The output from the image sensor 1002 is input from a terminal 1201. The A image and the A+B image are output in an alternating manner from the image sensor 1002, at the timings indicated by S1301 and S1302 included in the horizontal period indicated by S1305.

A image memory 1203 takes and accumulates one frame's worth of the image from the period indicated by S1301 (the A image). Additionally, the content of the A image memory 1203 is transferred and copied to A image memory 1204 before the A image memory 1203 takes the next frame. As a result, the A image memory 1204 holds the same content as that in the A image memory 1203 one frame previous. A+B image memory 1205 takes images shot during continuous shooting.

In the third embodiment, different readout methods are used when reading out from the image sensor 1002 to carry out focus detection and display, and when reading out to shoot an image. When carrying out readout to shoot an image, only the A+B image is read out, and the A image is not read out.

During focus detection and display, readout time is saved by reducing the number of pixels which are read out, by adding three pixels in the horizontal direction, thinning pixels between vertical rows, and so on. For example, an image with a resolution of 1980×1080 or the like is read out during focus detection and display, whereas a high-resolution image, e.g., 3840×2160, is read out during shooting. As such, if both the A image and the A+B image are read out as the shot image, the speed of continuous shooting will drop.

When the A+B image is taken into the A+B image memory 1205, the A+B image is resized to the same resolution as the A image within the A image memory 1203.

FIG. 13B is a timing chart illustrating continuous shooting operations according to the third embodiment. S1306 indicates a period in which the image sensor 1002 is exposed for display and focus detection. S1307 indicates a readout period in which the signals obtained from the exposure in step S1306 are read out. At this time, the A image and the A+B image indicated by S1301 and S1302 are read out.

S1308 indicates a correlation computation and focus driving period. In step S1308, the focus detection unit 1008 determines the next focus driving position and carries out focus detection by processing the signals read out in step S1307.

S1309 is a period of exposure for continuous shot recording. In the period indicated by S1310, the A+B image is read out from the image sensor 1002 and processed. The processed A+B image is recorded as a shot image in the recording unit 1006 in the period indicated by S1316.

In parallel with the recording processing, exposure for the next focus detection and display is carried out in step S1311. Thus in the third embodiment, the exposure for recording and the exposure for focus detection and display are carried out in an alternating manner.

States of the internal memories in the defocus map generating unit 1007 at the timing at which the readout of step S1312 has ended will be described next. The A image corresponding to step S1311 (a second viewpoint image which corresponds to a second partial pupil region of the exit pupil of the optical imaging system and which has been obtained from the third shooting) is stored in the A image memory 1203. The A image corresponding to step S1306 (a first viewpoint image which corresponds to a first partial pupil region of the exit pupil of the optical imaging system and which has been obtained from the first shooting) is stored in the A image memory 1204. The A+B image corresponding to step S1309 (a first mixed image which corresponds to a mixed region combining the first partial pupil region and the second partial pupil region and which has been obtained from second shooting) is stored in the A+B image memory 1205. In other words, the A+B image corresponding to the shot image which has been recorded, and the A images from before and after that A+B image, are stored in the respective memories.

Next, an intermediate A image generating unit 1206 reads out the A images from the A image memory 1203 and the A image memory 1204, generates an intermediate A image from the two A images (a third viewpoint image corresponding to the first partial pupil region, which corresponds to the second shooting), and transfers the intermediate A image to intermediate A image memory 1207. The intermediate A image generating unit 1206 uses a technique for generating an intermediate frame from previous and following images for the purpose of increasing the framerate. Note that any desired known technique can be used as the technique for generating the intermediate frame.

Once the intermediate A image has been stored in the intermediate A image memory 1207, a B image corresponding to the intermediate A image (a fourth viewpoint image corresponding to the second partial pupil region, which corresponds to the second shooting) can be obtained by subtracting the A+B image in the A+B image memory 1205 from the intermediate A image. A B image generating unit 1208 generates the B image through this subtracting processing and stores the B image in B image memory 1209. A pair of images including the A image and the B image is obtained as a result.

A correlation computation unit 1210 generates a defocus map (depth information) by carrying out a computation based on the A image and B image pair obtained in this manner. The correlation computation unit 1210 divides the image plane into a fine mesh constituted by blocks which each includes several tens to several hundreds of pixels, and detects an image displacement amount between the A image and the B image in each block. Skew between the image sensor 1002 and the optical axis of the optical imaging system 1001, input from a terminal 1202, as well as a distance to the pupil of the optical imaging system 1001 and an aperture size, are used to find a coefficient based on the image displacement amount. The mesh-shaped defocus map calculated in this manner is output from a terminal 1211 and recorded by the recording unit 1006.

To describe with reference to the timing chart in FIG. 13B, in step S1313, the focus detection unit 1008 carries out focus driving to prepare for the next shot. In step S1314, the intermediate A image is generated and stored in the intermediate A image memory 1207. In step S1315, the defocus map is generated, and in step S1317, the defocus map is recorded.

By repeating such operations, shot images which have been shot consecutively, and defocus maps corresponding to those shot images, can be recorded while carrying out focus detection.

In step S1318, which corresponds to the final exposure in the continuous shooting, processing for reading out the A image and the A+B image and recording the defocus map is carried out, in the same manner as in step S1311. From step S1319, which corresponds to the next exposure, there is no need for focus detection, and only display is sufficient; as such, only the A+B image is read out, without reading out the A image. Thus in the continuous shooting sequence according to the present embodiment, the A image is always read out last.

Figure 14:
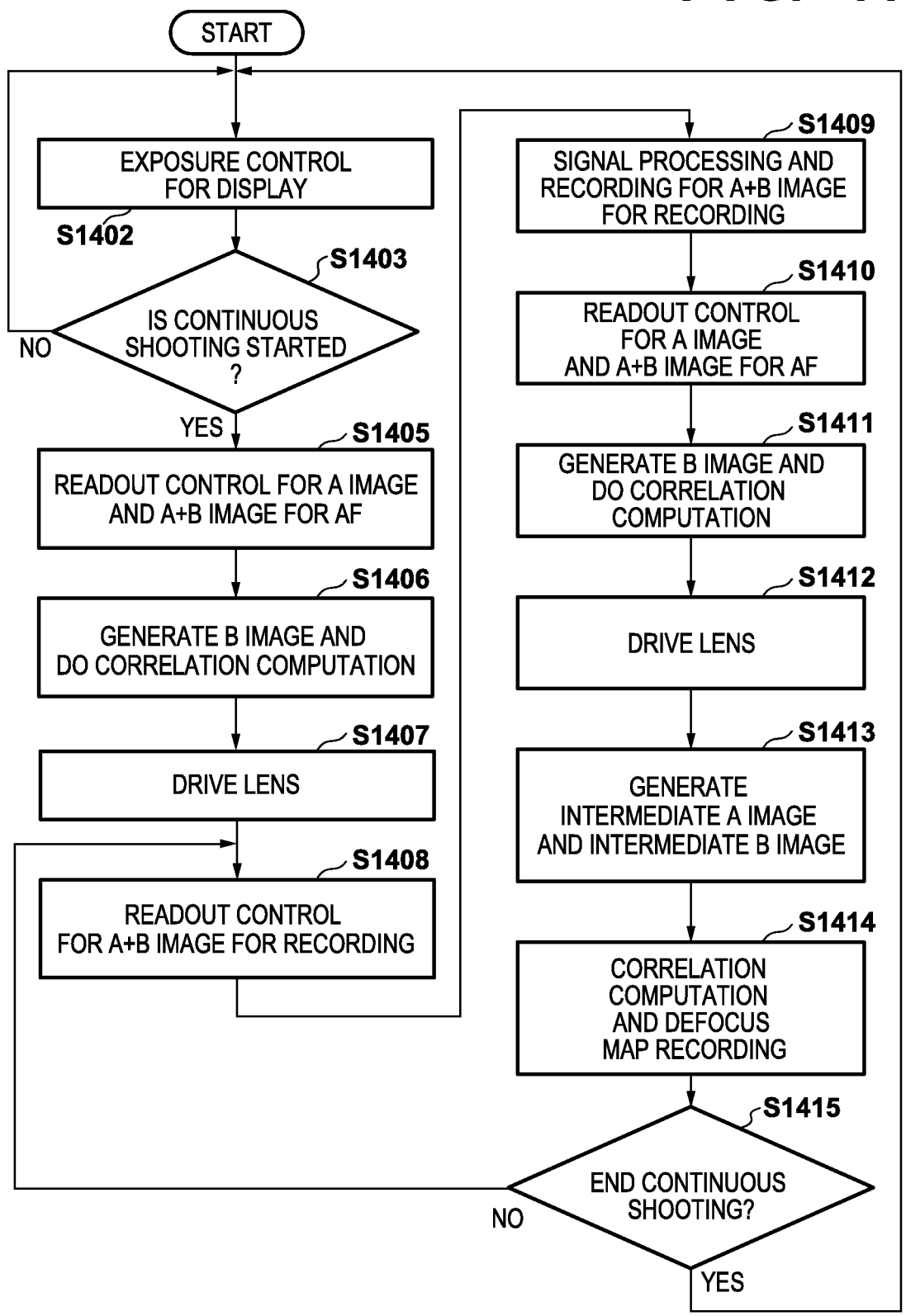
FIG. 14 is a flowchart of a control program executed by a control unit 1011 according to the third embodiment.

The overall operations described thus far are controlled by the control unit 1011. FIG. 14 is a flowchart of a control program executed by the control unit 1011 according to the third embodiment. The processing of this flowchart starts upon an operating mode of the image capturing apparatus 1000 being set to a shooting mode and the image capturing apparatus 1000 entering a shooting standby state.

In step S1402, the control unit 1011 carries out control for display exposure and display. In readout operations for the exposure in step S1402, only the A+B image is read out and displayed, without reading out the A image. As a result, the power consumption is reduced, and the shooting standby time is extended.

In step S1403, the control unit 1011 determines whether or not to start continuous shooting. If continuous shooting is to be started, the sequence moves to step S1405, and if not, the sequence returns to step S1402.

In step S1405, the control unit 1011 carries out AF exposure control as well as A image and A+B image readout control. In step S1406, the control unit 1011 uses the B image generating unit 1004 to generate the B image by subtracting the A image from the A+B image. The focus detection unit 1008 then obtains a defocus amount by carrying out a correlation computation.

In step S1407, the lens driving unit 1009 drives the lens of the optical imaging system 1001 on the basis of the defocus amount obtained in step S1406. In step S1408, the control unit 1011 carries out recording exposure control as well as A+B image readout control. In step S1409, the signal processing unit 1003 carries out signal processing on the A+B image read out in step S1408, and the recording unit 1006 records the A+B image subjected to the signal processing.

In step S1410, the control unit 1011 again carries out AF exposure control as well as A image and A+B image readout control. In step S1411, the control unit 1011 uses the B image generating unit 1004 to generate the B image by subtracting the A image from the A+B image. The focus detection unit 1008 then obtains a defocus amount by carrying out a correlation computation.

In step S1412, the lens driving unit 1009 drives the lens of the optical imaging system 1001 on the basis of the defocus amount obtained in step S1411 to prepare for the next recording exposure.

In step S1413, the intermediate A image generating unit 1206 generates the intermediate A image from the two A images obtained in steps S1405 and S1410, respectively, and stores the intermediate A image in the intermediate A image memory 1207. Additionally, the B image generating unit 1208 generates a B image (an intermediate B image) by subtracting the intermediate A image from the A+B image obtained in step S1408, and stores the intermediate B image in the B image memory 1209. Note that if the sequence has returned to step S1408 from step S1415 (described later) and once again reached step S1413, the intermediate A image is generated on the basis of the two A images obtained in the current and previous instances of step S1410.

In step S1414, the correlation computation unit 1210 generates a defocus map by carrying out a correlation computation on the intermediate A image and the intermediate B image. The recording unit 1006 records the generated defocus map.

In step S1415, the control unit 1011 determines whether or not to end continuous shooting. The sequence returns to step S1402 if the continuous shooting is to be ended. The sequence returns to step S1408 if the continuous shooting is to be continued.

As described thus far, according to the third embodiment, the image capturing apparatus 1000 generates the intermediate A image on the basis of two A images from frames before and after a frame in which only the A+B image is read out, and generates the B image by subtracting the A+B image from the intermediate A image. Accordingly, viewpoint images can be generated for the frame in which only the A+B image is read out (the A image and the B image).

Although the foregoing describes the three frames as being sequential frames, the frames need not be sequential. However, using sequential frames makes it possible to increase the accuracy of the intermediate A image.

Additionally, the foregoing describes the intermediate A image as being generated on the basis of the two A images from frames before and after a frame in which only the A+B image is read out. However, the intermediate A image may be generated through an extrapolation computation based on two A images from two frames before the frame in which only the A+B image is read out, or two A images from two frames after the frame in which only the A+B image is read out. Any desired known technique can be used for the extrapolation computation. Although the A image generated through an extrapolation computation is not, strictly speaking, an "intermediate" of the two A images, but is referred to as an "intermediate A image" for the sake of simplicity.

Fourth Embodiment

A fourth embodiment will describe a configuration for improving the accuracy of the intermediate A image. In the present embodiment, the basic configuration of the image capturing apparatus 1000 is the same as in the third embodiment (see FIG. 10). The following will primarily describe areas that are different from the third embodiment.

Figure 15:
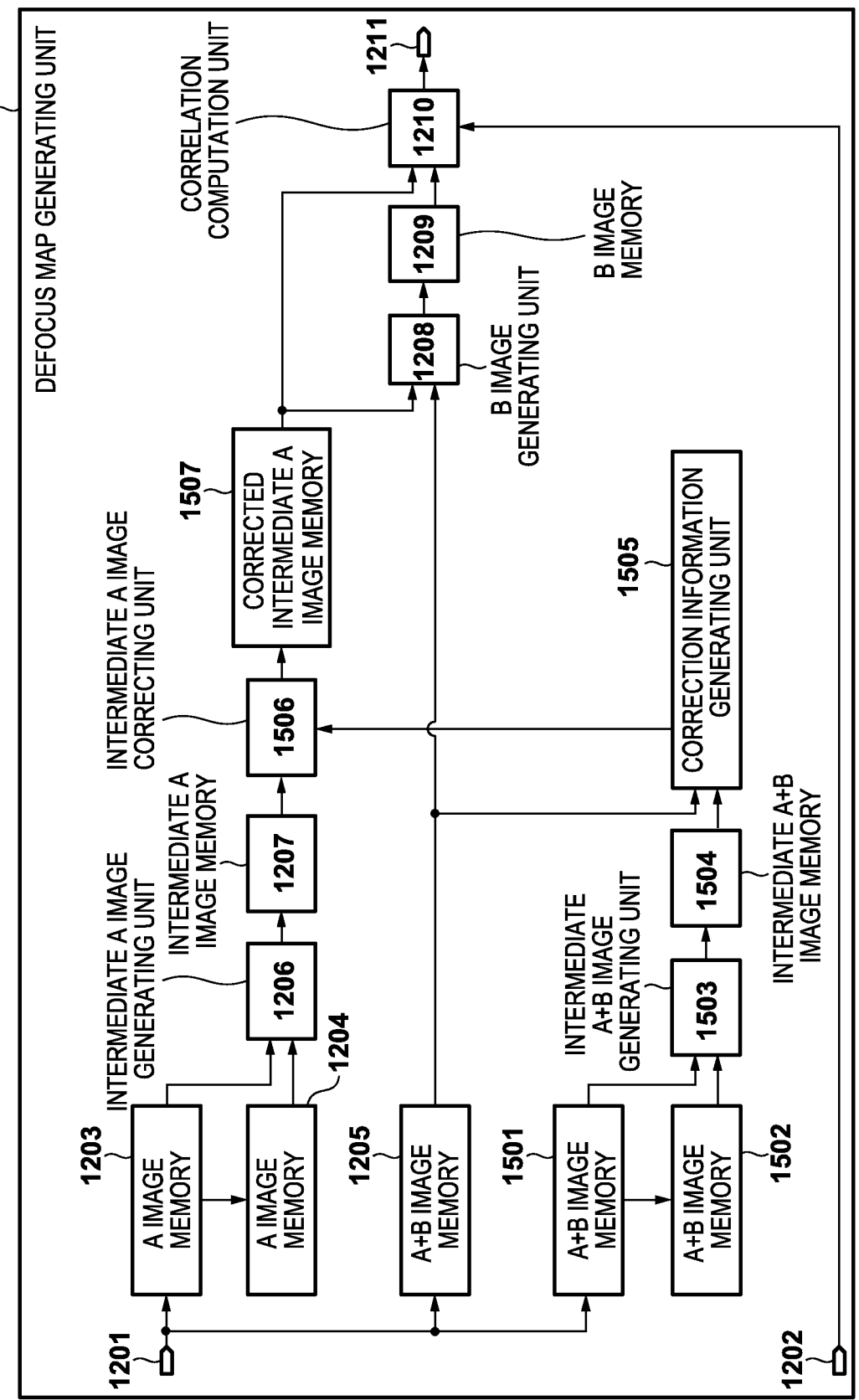
FIG. 15 is a block diagram illustrating the internal configuration of a defocus map generating unit 1007 according to the fourth embodiment.

FIG. 15 is a block diagram illustrating the internal configuration of the defocus map generating unit 1007 according to the fourth embodiment.

A+B image memory 1501 takes and accumulates one frame's worth of the image from the period indicated by S1302 (the A+B image). Additionally, the content of the A+B image memory 1501 is transferred and copied to A+B image memory 1502 before the A+B image memory 1501 takes the next frame. As a result, the A+B image memory 1502 holds the same content as that in the A+B image memory 1501 one frame previous.

As a result, an A+B image corresponding to the same exposure period as the A image in the A image memory 1203 (a third mixed image corresponding to the mixed region, obtained through the third shooting) is stored in the A+B image memory 1501. Additionally, an A+B image corresponding to the same exposure period as the A image in the A image memory 1204 (a second mixed image corresponding to the mixed region, obtained through the first shooting) is stored in the A+B image memory 1502. An intermediate A+B image generating unit 1503 generates an intermediate A+B image from the two A+B images stored in the A+B image memory 1501 and the A+B image memory 1502 (a fourth mixed image corresponding to the mixed region, which corresponds to the second shooting), and saves the intermediate A+B image in intermediate A+B image memory 1504.

The intermediate A+B image stored in the intermediate A+B image memory 1504 can be thought of as a simulated version of the A+B image stored in the A+B image memory 1205 (the real A+B image). As such, error in the intermediate A+B image can be found by detecting a motion vector between the intermediate A+B image and the real A+B image. A more accurate intermediate A image can be obtained by, on the basis of the motion vector, applying the inverse of the location and amount where feature points are displaced to the intermediate A image stored in the intermediate A image memory 1207 and correcting the positions of the feature points by moving the feature points. In other words, a correction information generating unit 1505 detects a motion vector on the basis of the intermediate A+B image and the real A+B image, and generates correction information. An intermediate A image correcting unit 1506 corrects the intermediate A image stored in the intermediate A image memory 1207 on the basis of the correction information generated by the correction information generating unit 1505, and transfers the corrected intermediate A image to corrected intermediate A image memory 1507.

The B image generating unit 1208 generates the B image (the intermediate B image) in the same manner as in the third embodiment. However, in the fourth embodiment, the intermediate B image is generated using the corrected intermediate A image instead of the intermediate A image.

In this manner, in the fourth embodiment, the intermediate A image is corrected on the basis of the A+B image for recording and the A+B image from the frames before and after the A+B image for recording.

FIG. 16 is a timing chart illustrating continuous shooting operations according to the fourth embodiment. In this timing chart, steps (timings) in which processing identical or similar to that in FIG. 13B is performed are given the same reference numerals as in FIG. 13B.

In step S1601, the intermediate A+B image generating unit 1503 generates the intermediate A+B image and stores the intermediate A+B image in the intermediate A+B image memory 1504. In step S1602, the correction information generating unit 1505 detects a motion vector on the basis of the intermediate A+B image stored in the intermediate A+B image memory 1504 and the A+B image stored in the A+B image memory 1205, and creates the correction information. In step S1603, the intermediate A image correcting unit 1506 corrects the intermediate A image on the basis of the correction information generated in step S1602, and stores the corrected intermediate A image to corrected intermediate A image memory 1507. In step S1604, the B image generating unit 1208 generates the B image (the intermediate B image) on the basis of the corrected intermediate A image and the A+B image, and stores the B image in the B image memory 1209; and the correlation computation unit 1210 generates a defocus map by carrying out a correlation computation on the basis of the corrected intermediate A image and the intermediate B image.

The overall operations described thus far are controlled by the control unit 1011. FIG. 17 is a flowchart of a control program executed by the control unit 1011 according to the fourth embodiment. The processing of this flowchart starts upon an operating mode of the image capturing apparatus 1000 being set to a shooting mode and the image capturing apparatus 1000 entering a shooting standby state. In this flowchart, steps that perform processing identical or similar to that in FIG. 14 are given the same reference numerals as in FIG. 14.

In step S1701, the intermediate A image generating unit 1206 generates the intermediate A image in the same manner as in step S1413 of FIG. 14, and stores the intermediate A image in the intermediate A image memory 1207. Unlike step S1413, the intermediate B image is not generated in step S1701.

In step S1702, the intermediate A+B image generating unit 1503 generates the intermediate A+B image from the two A+B images obtained in steps S1405 and S1410, respectively, and stores the intermediate A+B image in the intermediate A+B image memory 1504. Note that if the sequence has returned to step S1408 from step S1415 and once again reached step S1702, the intermediate A+B image is generated on the basis of the two A+B images obtained in the current and previous instances of step S1410.

In step S1703, the correction information generating unit 1505 generates the correction information using the intermediate A+B image generated in step S1702 and the A+B image obtained in step S1408.

In step S1704, the intermediate A image correcting unit 1506 corrects the intermediate A image generated in step S1701 using the correction information generated in step S1703. Additionally, the B image generating unit 1208 generates a B image (an intermediate B image) by subtracting the corrected intermediate A image from the A+B image obtained in step S1408, and stores the intermediate B image in the B image memory 1209.

In step S1705, the correlation computation unit 1210 generates a defocus map by carrying out a correlation computation on the corrected intermediate A image and the intermediate B image. The recording unit 1006 records the generated defocus map.

As described thus far, according to the fourth embodiment, the image capturing apparatus 1000 corrects the intermediate A image on the basis of a motion vector between the intermediate A+B image and the real A+B image. The accuracy of the intermediate A image can be increased as a result.

The third embodiment and the fourth embodiment describe configurations in which the generated defocus map (depth information) is recorded. However, the image capturing apparatus 1000 may record the intermediate A image (in the case of the third embodiment) or the corrected intermediate A image (in the case of the fourth embodiment), and generate the defocus map at the time of playback. Additionally, beyond being used to generate the defocus map, the intermediate A image and the corrected intermediate A image can be used to generate a stereo image, an intermediate viewpoint image, or the like.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-145660, filed Aug. 7, 2019 which is hereby incorporated by reference herein in its entirety.

What is claimed is:

1. A depth information generating apparatus comprising at least one processor and/or at least one circuit which functions as:
   a first generating unit configured to generate first depth information on the basis of a plurality of viewpoint images which are obtained from first shooting and which have mutually-different viewpoints, and generate third depth information on the basis of a plurality of viewpoint images which are obtained from third shooting and which have mutually-different viewpoints; and
   a second generating unit configured to generate, from the first depth information and the third depth information, second depth information for a captured image obtained from second shooting, the second depth information being generated on the basis of a change in depth caused by a difference in focal distances of the first shooting, the second shooting, and the third shooting, and on the basis of a difference in timings of the first shooting, the second shooting, and the third shooting, wherein the first shooting, the second shooting, and the third shooting are performed using a same image sensor, at different points in time.

2. The depth information generating apparatus according to claim 1,
   wherein the second generating unit:
      generates fourth depth information corresponding to the focal distance of the first shooting and the timing of the third shooting by correcting the third depth information so as to cancel out a change in depth caused by a difference in the focal distance of the third shooting relative to the first shooting;
      generates fifth depth information corresponding to the focal distance of the first shooting and the timing of the second shooting by carrying out interpolation or extrapolation of the first depth information and the fourth depth information on the basis of a difference in the timings of the first shooting, the second shooting, and the third shooting; and
      generates the second depth information by correcting the fifth depth information so as to reflect a change in depth caused by a difference in the focal distance of the second shooting relative to the first shooting.

3. The depth information generating apparatus according to claim 1,
   wherein the second generating unit:
      generates fourth depth information corresponding to the focal distance of the second shooting and the timing of the first shooting by correcting the first depth information so as to reflect a change in depth caused by a difference in the focal distance of the second shooting relative to the first shooting;
      generates fifth depth information corresponding to the focal distance of the second shooting and the timing of the third shooting by correcting the third depth information so as to reflect a change in depth caused by a difference in the focal distance of the second shooting relative to the third shooting; and
      generates the second depth information by carrying out interpolation or extrapolation of the fourth depth information and the fifth depth information on the basis of a difference in the timings of the first shooting, the second shooting, and the third shooting.

4. The depth information generating apparatus according to claim 1, wherein the second shooting does not obtain a plurality of viewpoint images which have mutually-different viewpoints.

5. A depth information generating method executed by a depth information generating apparatus, comprising:

generating first depth information on the basis of a plurality of viewpoint images which are obtained from first shooting and which have mutually-different viewpoints, and generate third depth information on the basis of a plurality of viewpoint images which are obtained from third shooting and which have mutually-different viewpoints; and generating, from the first depth information and the third depth information, second depth information for a captured image obtained from second shooting, which does not obtain a plurality of viewpoint images which have mutually-different viewpoints, the second depth information corresponding to a focal distance and a timing of the second shooting, the second depth information being generated on the basis of a change in depth caused by a difference in focal distances of the first shooting, the second shooting, and the third shooting, and on the basis of a difference in timings of the first shooting, the second shooting, and the third shooting, wherein the first shooting, the second shooting, and the third shooting are performed using a same image sensor, at different points in time.

\* \* \* \* \*